United States Patent [19]

Tzikas

[11] Patent Number: 5,735,911
[45] Date of Patent: *Apr. 7, 1998

[54] FIBRE-REACTIVE DYES AND DYE MIXTURES AND THEIR USE

[75] Inventor: Athanassios Tzikas, Pratteln, Switzerland

[73] Assignee: Ciba Specialty Chemicals Corporation, Tarrytown, N.Y.

[*] Notice: The term of this patent shall not extend beyond the expiration date of Pat. No. 5,232,462.

[21] Appl. No.: 775,920

[22] Filed: Jan. 2, 1997

Related U.S. Application Data

[63] Continuation of Ser. No. 456,215, May 31, 1995, Pat. No. 5,612,463, which is a continuation of Ser. No. 48,082, Apr. 15, 1993, Pat. No. 5,451,665, which is a division of Ser. No. 764,555, Sep. 20, 1991, Pat. No. 5,232,462.

Foreign Application Priority Data

Sep. 25, 1990 [CH] Switzerland .................. 3077/90

[51] Int. Cl.$^6$ ............ C09B 67/22; D06P 1/38; D06P 3/66
[52] U.S. Cl. ........................ 8/547; 8/549
[58] Field of Search ........................ 8/549, 547

[56] References Cited

U.S. PATENT DOCUMENTS

| | | | |
|---|---|---|---|
| 3,454,551 | 7/1969 | Mangini et al. | 544/189 X |
| 3,647,778 | 3/1972 | Andrew et al. | 260/153 |
| 4,228,071 | 10/1980 | Riat et al. | 260/153 |
| 4,230,852 | 10/1980 | Sweda et al. | 544/189 |
| 4,323,497 | 4/1982 | Hoyer | 260/146 |
| 4,378,312 | 3/1983 | Hoyer et al. | 534/634 X |
| 4,502,866 | 3/1985 | Brenneisen | 8/549 |
| 4,670,547 | 6/1987 | Lehr | 534/637 |
| 4,762,916 | 8/1988 | Schlafer et al. | 534/634 X |
| 4,843,150 | 6/1989 | Hihara et al. | 534/634 X |
| 4,866,163 | 9/1989 | Koch | 534/634 |
| 5,019,134 | 5/1991 | Ridyard | 8/549 |
| 5,032,142 | 7/1991 | Egger et al. | 8/549 |
| 5,047,067 | 9/1991 | Miyazaki | 8/549 |
| 5,175,262 | 12/1992 | Loeffler et al. | 534/634 X |
| 5,200,511 | 4/1993 | Loeffler et al. | 534/634 X |
| 5,232,462 | 8/1993 | Tzikas | 8/549 |
| 5,243,033 | 9/1993 | Tzikas | 534/634 X |
| 5,399,182 | 3/1995 | Schwarz et al. | 8/549 X |
| 5,456,728 | 10/1995 | Schwarz et al. | 8/549 |

FOREIGN PATENT DOCUMENTS

| | | |
|---|---|---|
| 0458743 | 11/1991 | European Pat. Off. |
| 2611550 | 9/1976 | Germany |
| 53-27628 | 3/1978 | Japan |
| 1389053 | 4/1975 | United Kingdom |
| 1461125 | 1/1977 | United Kingdom |
| 1529645 | 10/1978 | United Kingdom |
| 2085908 | 5/1982 | United Kingdom |
| 2226336 | 6/1990 | United Kingdom |
| 2228738 | 9/1990 | United Kingdom |
| 2064571 | 6/1991 | United Kingdom |

OTHER PUBLICATIONS

Chemical Abstracts, vol. 89, No. 14, 112326 e (1978).

*Primary Examiner*—Fiona T. Powers
*Attorney, Agent, or Firm*—David R. Crichton; Kevin T. Mansfield

[57] ABSTRACT

The invention relates to dye mixtures which contain dyes of the formulae $$A_1-N\!\!=\!\!\stackrel{N}{\underset{R_1}{\diagdown}}\!\!-N\!\!=\!\!\stackrel{N}{\underset{N}{\diagdown}}\!\!-N\!\!<\!\!\stackrel{Z_1}{Z_2} \quad \text{and} \quad (1)$$

$$\underset{X_1}{|}$$

$$A_2-N\!\!=\!\!\stackrel{N}{\underset{R_2\ N}{\diagdown}}\!\!-N-B-N\!\!=\!\!\stackrel{N}{\underset{N\ R_4\ N}{\diagdown}}\!\!-N-A_3; \quad (2)$$

and to dyes of the formula $$A_2-N\!\!=\!\!\stackrel{N}{\underset{R_2\ N}{\diagdown}}\!\!-N-B_1-N\!\!=\!\!\stackrel{N}{\underset{N\ R_4\ N}{\diagdown}}\!\!-N-A_3, \quad (2a)$$

in which $A_1$, $A_2$, $A_3$, B, $B_1$, $R_1$, $R_2$, $R_3$, $R_4$, $R_5$, $Z_1$, $Z_2$, $X_1$, $X_2$ and $X_3$ are as defined in claim 1.

The dyes and dye mixtures are distinguished by generally good properties and produce dyeings and prints having good wet and light fastness properties.

13 Claims, No Drawings

FIBRE-REACTIVE DYES AND DYE MIXTURES AND THEIR USE

This is a continuation of application Ser. No. 08/456,215, filed May 31, 1995, now U.S. Pat. No. 5,612,463, which is a continuation of application Ser. No. 08/048,082 filed Apr. 15, 1993, now U.S. Pat. No. 5,451,665, which is a divisional of application Ser. No. 07/764,555, filed Sep. 20, 1991, now U.S. Pat. No. 5,232,462.

The present invention relates to fibre-reactive dyes and mixtures of fibre-reactive dyes which are suitable for dyeing cellulose-containing fibre materials from an aqueous bath and for printing cellulose-containing fibre materials, which are suitable for dyeing by the exhaust method and continuous method and produce wet fast and light fast dyeings.

The invention relates to dye mixtures which contain dyes of the formulae

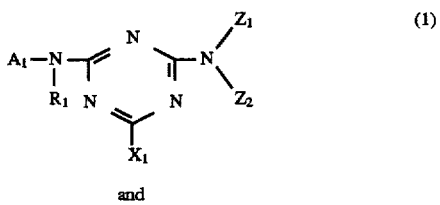

and

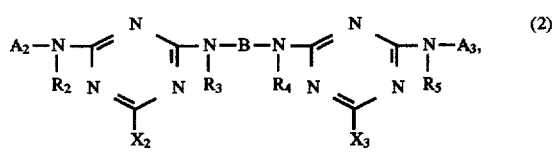

in which $A_1$, $A_2$ and $A_3$, independently of one another, are the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $R_1$, $R_2$, $R_3$, $R_4$ and $R_5$, independently of one another, are hydrogen or $C_1$–$C_4$alkyl, which can be substituted by halogen, hydroxyl, cyano, $C_1$–$C_4$alkoxy, $C_1$–$C_4$alkoxycarbonyl, carboxyl, sulfamoyl, sulfo or sulfato, B is an aliphatic or aromatic bridging member, and $Z_1$ and $Z_2$ are hydrogen or an aliphatic, aromatic or heterocyclic radical, or $Z_1$ and $Z_2$, together with the nitrogen atom linking them, form a five- to seven-membered ring, which apart from C atoms can contain further heteroatoms, and $X_1$, $X_2$ and $X_3$, independently of one another, are fluorine, chlorine, bromine, sulfo or carboxypyridinium.

The invention also relates to dyes of the formula

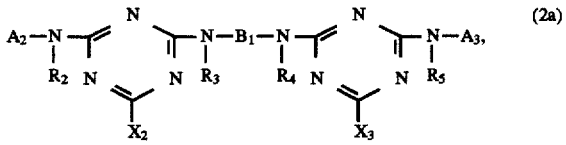

in which the substitutents $A_2$, $A_3$, $R_2$, $R_3$, $R_4$, $R_5$, $X_2$ and $X_3$ are as defined in formula (2) and $B_1$ is an aliphatic bridging member.

The radical $A_1$, $A_2$ or $A_3$ can contain substituents customary for organic dyes bound to its basic structure.

Examples of further substituents in the radical $A_1$, $A_2$ or $A_3$ are: alkyl groups with 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, in particular alkanoylamino groups, such as acetylamino, propionylamino or benzoylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)sulfamoyl, N,N-di-(β-hydroxyethyl) sulfamoyl, N-phenylsulfamoyl, ureido, hydroxyl, carboxyl, sulfomethyl or sulfo and fibre-reactive radicals. The radical $A_1$, $A_2$ or $A_3$ preferably contains one or more sulfo groups. Reactive dyes of the formulae (1) and (2), in which $A_1$, $A_2$ or $A_3$ is the radical of an azo dye, contain as substituents in particular methyl, ethyl, methoxy, ethoxy, acetylamino, benzoylamino, amino, chlorine, bromine, ureido, hydroxyl, carboxyl, sulfomethyl or sulfo.

An alkyl radical $R_1$, $R_2$, $R_3$, $R_4$ or $R_5$ is straight-chain or branched; it can be further substituted, for example by halogen, hydroxyl, cyano, $C_1$–$C_4$alkoxy, $C_1$–$C_4$alkoxycarbonyl, carboxyl, sulfamoyl, sulfo or sulfato. Examples of suitable $R_1$, $R_2$, $R_3$, $R_4$ and $R_5$ radicals are as follows: methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. $R_1$, $R_2$, $R_3$, $R_4$ and $R_5$, independently of one another, are preferably hydrogen, methyl or ethyl.

The radicals $X_1$, $X_2$ and $X_3$, independently of one another, are fluorine, chlorine, bromine, carboxypyridinium or a sulfo group. $X_1$, $X_2$ and $X_3$ are preferably fluorine or chlorine.

The aliphatic or aromatic bridging member B is preferably an alkylene, aralkylene or arylene radical. The term aliphatic bridging member also includes cycloaliphatic radicals. Thus, B can be a straight-chain or branched $C_1$–$C_{10}$alkylene radical; it is in particular an alkylene radical having 2 to 6 carbon atoms, for example ethylene, propylene, butylene, hexylene or cyclohexylene. Examples of an arylene radical B are a naphthylene radical, the radical of a diphenyl or stilbene or in particular a phenylene radical. An aralkylene radical B is in particular a benzylene radical. The radical B can contain further substituents, for example halogen atoms, such as fluorine, chlorine and bromine, alkyl groups having 1 to 4 carbon atoms, such as methyl, ethyl and propyl, alkoxy groups having 1 to 4 carbon atoms, such as methoxy, ethoxy, propoxy and isopropoxy, carboxyl or sulfo. B is preferably $C_2$–$C_6$alkylene or substituted or unsubstituted phenylene. The ethylene radical, phenylene radical and sulfophenylene radical are preferred.

The aliphatic bridging member $B_1$ is preferably an alkylene radical. The term aliphatic bridging member also includes cycloaliphatic radicals. Thus, $B_1$ can be a straight-chain or branched $C_1$–$C_{10}$alkylene radical; it is in particular an alkylene radical having 2 to 6 carbon atoms, for example ethylene, propylene, butylene, hexylene or cyclohexylene. The radical $B_1$ can contain further substituents, for example halogen atoms, such as fluorine, chlorine and bromine, alkyl groups having 1 to 4 carbon atoms, such as methyl, ethyl and propyl, alkoxy groups having 1 to 4 carbon atoms, such as methoxy, ethoxy, propoxy and isopropoxy, carboxyl or sulfo. $B_1$ is preferably $C_2-C_6$alkylene. The ethylene radical is preferred.

Examples of suitable substituted amino groups

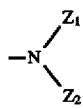

are: alkylamino, N,N-dialkylamino, cycloalkylamino, N,N-dicycloalkylamino, aralkylamino, arylamino groups, differently substituted amino groups, such as N-alkyl-N-cyclohexylamino and N-alkyl-N-arylamino groups, furthermore amino groups containing heterocyclic radicals, which may contain further fused-on carbocyclic rings, and amino groups in which the amino nitrogen atom is a member of an N-heterocyclic ring which may contain further hetero atoms. The abovementioned alkyl radicals can be straight-chain or branched and can have a low or high molecular weight, alkyl radicals having 1 to 6 carbon atoms being preferred; suitable cycloalkyl, aralkyl and aryl radicals are in particular cyclohexyl, benzyl, phenethyl, phenyl and naphthyl radicals; heterocyclic radicals are in particular furan, thiophene, pyrazole, pyridine, pyrimidine, quinoline, benzimidazole, benzothiazole and benzoxazole radicals; amino groups in which the amino nitrogen atom is a member of an N-heterocyclic ring are preferably radicals of six-membered N-heterocyclic compounds, which may contain nitrogen, oxygen and sulfur as further heteroatoms. The abovementioned alkyl, cycloalkyl, aralkyl and aryl radicals, the heterocyclic radicals and the N-heterocyclic rings can be further substituted, for example by halogen, such as fluorine, chlorine and bromine, nitro, cyano, trifluoromethyl, sulfamoyl, carbamoyl, $C_1-C_4$alkyl, $C_1-C_4$alkoxy, acylamino groups, such as acetylamino, ureido, hydroxyl, carboxyl, sulfomethyl and sulfo. The amino group

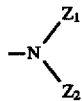

can furthermore contain fibre-reactive radicals.

Examples of the amino radical

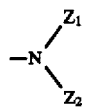

in formula (1) are: —$NH_2$, methylamino, ethylamino, propylamino, isopropylamino, butylamino, β-(acetylamino) ethylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, N-methyl-N-phenylamino, N-ethyl-N-phenylamino, N-propyl-N-phenylamino, N-butyl-N-phenylamino, N-β-cyanoethyl-N-phenylamino, N-ethyl-2-methylphenylamino, N-ethyl-4-methylphenylamino, N-ethyl-3-sulfophenylamino, N-ethyl-4-sulfophenylamino, phenylamino, toluidino, xylidino, chloroanilino, anisidino, phenetidino, 2-, 3- and 4-sulfoanilino, 2,5-disulfoanilino, sulfomethylanilino, N-sulfomethylanilino, 3- and 4-carboxyphenylamino, 2-carboxy-5-sulfophenylamino, 2-carboxy-4-sulfophenylamino, 4-sulfo-(1)-naphthylamino, 3,6-disulfonaphthyl-(1)-amino, 3,6,8-trisulfo-1-naphthylamino, 4,6,8-trisulfo-1-naphthylamino, 6-sulfo-2-naphthylamino, 2-pyridylamino, morpholino, piperidino und piperazino.

Other suitable reactive dyes of the formulae (1), (2) and (2a) are those in which the radical $A_1$, $A_2$ or $A_3$ includes a further reactive radical. The additional reactive radicals included in $A_1$, $A_2$ or $A_3$ can be bound, for example to $A_1$, $A_2$ or $A_3$ by a direct bond, via amino groups or in a different manner.

An additional reactive radical included, if desired, in $A_1$, $A_2$ or $A_3$ or $Z_1$ or $Z_2$ is in particular a low-molecular-weight alkanoyl or alkylsulfonyl radical substituted by a detachable atom or a detachable group, a low-molecular-weight alkenoyl or alkenesulfonyl radical which is unsubstituted or substituted by a detachable atom or a detachable group, a carbo- or heterocyclic radical containing 4-, 5- or 6-membered rings, bound via a carbonyl or sulfonyl group and substituted by a detachable atom or a detachable group or a triazine or pyrimidine radical bound directly via a carbon atom and substituted by a detachable atom or a detachable group, or contains such a radical. Examples of reactive radicals of this type are a six-membered heterocyclic radical bound via an amino group and containing halogen atoms, such as a halotriazine or halopyrimidine radical or an aliphatic acyl radical, such as an haloacetyl or halopropionyl radical.

Additional reactive radicals included in $A_1$, $A_2$, $A_3$, $Z_1$ and $Z_2$ are in particular heterocyclic radicals containing at least one detachable substituent bound to a heterocyclic radical, inter alia those containing at least one reactive substituent bound to a 5- or 6-membered heterocyclic ring, such as to a monoazine, diazine, triazine, for example pyridine, pyrimidine, pridazine, pyrazine, thiazine, oxazine or asymmetrical or symmetrical, triazine ring or to such a ring system which contains one or more fused-on aromatic rings, such as a quinoline, phthalazine, quinoline, quinazoline, quinoxaline, acridine, phenazine and phenanthridine ring system; the 5- or 6-membered heterocyclic rings containing at least one reactive substituent are thus preferably those which contain one or more nitrogen atoms and can contain fused-on 5- or preferably 6-membered carbocyclic rings.

Examples of reactive substituents on the heterocycle are: halogen (Cl, Br or F), ammonium, including hydrazinium and sulfonium, sulfonyl, azido($N_3$), thiocyanato, mercapto, mercaptoether, hydroxyether, sulfino and sulfo. Individual examples are:

Mono- or dihalo-symmetrical-triazinyl radicals, for example 2,4-dichloro-6-triazinyl, 2-amino-4-chloro-6-triazinyl, 2-alkylamino-4-chloro-6-triazinyl, such as 2-methylamino-4-chloro-6-triazinyl, 2-ethylamino- or 3-propylamino-4-chloro-6-triazinyl, 2-β-hydroxyethylamino-4-chloro-6-triazinyl, 2-di(β-hydroxyethyl)amino-4-chloro-6-triazinyl and the corresponding sulfuric monoesters, 2-diethylamino-4-chloro-6-triazinyl, 2-morpholino- or 2-piperidino-4-chloro-6-triazinyl, 2-cyclohexylamino-4-chloro-6-triazinyl, 2-arylamino- and substituted arylamino-4-chloro-6-triazinyl, such as 2-phenylamino-4-chloro-6-triazinyl, 2-(o-, m- or p-carboxy- or sulfophenyl)amino-4-chloro-6-triazinyl, 2-alkoxy-4-chloro-6-triazinyl, such as 2-methoxy- or -ethoxy-4-chloro-6-triazinyl, 2-(phenylsulfonylmethoxy)-4-chloro-6-triazinyl, 2-aryloxy- and substituted -aryloxy-4-chloro-6-triazinyl, such as 2-phenoxy-4-chloro-6-triazinyl, 2-(p-sulfophenyl)oxy-4-chloro-6-triazinyl, 2-(o-, m- or p-methyl- or methoxyphenyl)oxy-4-chloro-6-triazinyl, 2-alkylmercapto- or 2-arylmercapto- or 2-(substituted aryl)

mercapto-4-chloro-6-triazinyl, such as 2-β-hydroxyethylmercapto-4-chloro-6-triazinyl, 2-phenylmercapto-4-chloro-6-triazinyl, 3-(4'-methyl) phenylmercapto-4-chloro-6-triazinyl, 2-(2',4'-dinitro) phenylmercapto-4-chloro-6-triazinyl, 2-methyl-4-chloro-6-triazinyl, 2-phenyl-4-chloro-6-triazinyl, 2,4-difluoro-6-triazinyl, monofluorotriazinyl radicals substituted by amino, alkylamino, aralkylamino, acylamino groups of which alkyl, in particular substituted or unsubstituted $C_1$–$C_4$alkyl, aralkyl, in particular substituted or unsubstituted phenyl, $C_1$–$C_4$alkyl and aryl, in particular phenyl or naphthyl which are unsubstituted or substituted by sulfo, alkyl, in particular $C_1$–$C_4$alkyl, alkoxy, in particular $C_1$–$C_4$alkoxy, carboxyl, acylamino groups and halogen atoms, such as fluorine, chlorine or bromine, for example 2-amino-4-fluoro-6-triazinyl, 2-methylamino-4-fluoro-6-triazinyl, 2-ethylamino-4-fluoro-6-triazinyl, 2-isopropylamino-4-fluoro-6-triazinyl, 2-dimethylamino-4-fluoro-6-triazinyl, 2-diethylamino-4-fluoro-6-triazinyl, 2-β-methoxyethylamino-4-fluoro-6-triazinyl, 2-β-hydroxyethylamino-4-fluoro-6-triazinyl, 2-di(β-hydroxyethyl)amino-4-fluoro-6-triazinyl, 2-β-sulfoethylamino-4-fluoro-6-triazinyl, 2-β-sulfoethylmethylamino-4-fluoro-6-triazinyl, 2-β-carboxymethylamino-4-fluoro-6-triazinyl, 2-β-cyanoethylamino-4-fluoro-6-triazinyl, 2-phenylamino-4-fluoro-6-triazinyl, 2-β-phenylethylamino-4-fluoro-6-triazinyl, 2-benzylmethylamino-4-fluoro-6-triazinyl, 2-(2'-, 3'- or 4'-sulfobenzyl)amino-4-fluoro-6-triazinyl, 2-cyclohexylamino-4-fluoro-6-triazinyl, 2-(o-, m-, p-methyl)phenylamino-4-fluoro-6-triazinyl, 2-(o-, m-, p-sulfo)phenylamino-4-fluoro-6-triazinyl, 2-(2',5'-disulfo) phenylamino-4-fluoro-6-triazinyl, 2-(o-, m-, p-chloro) phenylamino-4-fluoro-6-triazinyl, 2-(o-, m-, p-methoxy) phenyl-4-fluoro-6-triazinyl, 2-(2'-methyl-4'-sulfo) phenylamino-4-fluoro-6-triazinyl, 2-(2'-methyl-5'-sulfo) phenylamino-4-fluoro-6-triazinyl, 2-(2'-chloro-4'-sulfo) phenylamino-4-fluoro-6-triazinyl, 2-(2'-chloro-5'-sulfo) phenylamino-4-fluoro-6-triazinyl, 2-(2'-methoxy-4'-sulfophenyl)amino-4-fluoro-6-triazinyl, 2-(o-, m-, p-carboxy)phenylamino-4-fluoro-6-triazinyl, 2-(2',4'-disulfo)phenylamino-4-fluoro-6-triazinyl, 2-(3',5'-disulfo) phenylamino-4-fluoro-6-triazinyl, 2-(2'-carboxy-4-sulfo) phenylamino-4-fluoro-6-triazinyl, 2-(2'-carboxy-4-sulfo) phenylamino-4-fluoro-6-triazinyl, 2-(6'-sulfo-2'-naphthylamino-4-fluoro-6-triazinyl, 2-(4',8'-disulfo-2'-naphthyl)-amino-4-fluoro-6-triazinyl, 2-(6',8'-disulfo-2'-naphthyl)-amino-4-fluoro-6-triazinyl, 2-(N-methylphenyl) amino-4-fluoro-6-triazinyl, 2-(N-ethylphenyl)amino-4-fluoro-6-triazinyl, 2-(N-β-hydroxyethylphenyl)amino-4-fluoro-6-triazinyl, 2-(N-isopropylphenyl)amino-4-fluoro-6-triazinyl, 2-morpholino-4-fluoro-6-triazinyl, 2-piperidino-4-fluoro-6-triazinyl, 2-(4',6',8'-trisulfo-2'-naphthyl)-4-fluoro-6-triazinyl, 2-(3',6',8'-trisulfo-2'-naphthyl)-4-fluoro-6-triazinyl, 2-(3',6'-disulfo-1-naphthyl)-4-fluoro-6-triazinyl, mono-, di- or trihalopyrimidinyl radicals, such as 2,4-dichloro-6-pyrimidinyl, 2,4,5-trichloro-6-pyrimidinyl, 2,4-dichloro-5-nitro- or -5-methyl- or -5-carboxymethyl- or -5-carboxy- or -5-cyano- or -5-vinyl- or -5-sulfo- or -5-mono-, -di- or -trichloromethyl- or -5-carboalkoxy-6-pyrimidinyl, 2,6-dichloropyrimidine-4-carbonyl-, 2,4-dichloropyrimidine-5-carbonyl-, 2-chloro-4-methylpyrimidine-5-carbonyl-, 2-methyl-4-chloropyrimidine-5-carbonyl-, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-6-carbonyl, 2,3-dichloroquinoxaline-6-sulfonyl, 1,4-dichlorophthalazine-6-sulfonyl or -6-carbonyl, 2,4-dichloroquinazoline-7- or -6-sulfonyl or -carbonyl, 2- or 3- or 4-(4',5'-dichloropyridazin-6'-yl)phenylsulfonyl or -carbonyl, β-(4',5'-dichloro-1'-pyridazon-6'-yl) ethylcarbonyl, N-methyl-N-(2,4-dichloro-6-triaziayl) carbamyl, N-methyl-N-(2-methylamino-4-chloro-6-triazinyl)carbamyl, N-methyl-N-(2-dimethylamino-4-chloro-6-triazinyl)carbamyl, N-methyl- or N-ethyl-N-(2,4-dichloro-6-triazinyl)aminoacetyl, N-methyl-N-(2,3-dichloroquinoxaline-6-sulfonyl)aminoacetyl, N-methyl-N-(2,3-dichloroquinoxaline-6-carbonyl)aminoacetyl, and the corresponding bromine and fluorine derivatives of the abovementioned chloro-substituted heterocyclic radicals, of these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl, 6-fluoro-5-chloro-4-pyrimidinyl, 6-fluoro-5-trifluoromethyl-4-pyrimidinyl, 6-fluoro-2-methyl-4-pyrimidinyl, 6-fluoro-5-chloro-2-methyl-4-pyrimidinyl, 5,6-difluoro-4-pyrimidinyl, 6-fluoro-5-chloro-2-trifluoromethyl-4-pyrimidinyl, 6-fluoro-2-phenyl-4-pyrimidinyl, 6-fluoro-5-cyano-4-pyrimidinyl, 6-fluoro-5-nitro-4-pyrimidinyl, 6-fluoro-5-methylsulfonyl-4-pyrimidinyl, 6-fluoro-5-phenylsulfonyl-4-pyrimidinyl, sulfonyl-containing triazine radicals, such as 2,4-bis (phenylsulfonyl)-6-triazinyl, 2-(3'-carboxyphenyl)sulfonyl-4-chloro-6-triazinyl, 2-(3'-sulfophenyl)sulfonyl-4-chloro-6-triazinyl, 2,4-bis(3'-carboxyphenylsulfonyl)-6-triazinyl; sulfonyl-containing pyrimidine rings, such as 2-carboxymethylsulfonyl-4-pyrimidinyl, 2-methylsulfonyl-6-methyl-4-pyrimidinyl, 2-methylsulfonyl-6-ethyl-4-pyrimidinyl, 2-phenylsulfonyl-5-chloro-6-methylpyrimidinyl, 2,6-bis(methylsulfonyl)-4-pyrimidinyl, 2,6-bis(methylsulfonyl)-5-chloro-4-pyrimidinyl, 2,4-bis (methylsulfonyl)pyrimidine-5-sulfonyl, 2-methylsulfonyl-4-pyrimidinyl, 2-phenylsulfonyl-4-pyrimidinyl, 2-trichloromethylsulfonyl-6-methyl-4-pyrimidinyl, 2-methylsulfonyl-5-chloro-6-methyl-4-pyrimidinyl, 2-methylsulfonyl-5-bromo-6-methyl-4-pyrimidinyl, 2-methylsulfonyl-5-chloro-6-ethyl-4-pyrimidinyl, 2-methylsulfonyl-5-chloro-6-chloromethyl-4-pyrimidinyl, 2-methylsulfonyl-4-chloro-6-methylpyrimidine-5-sulfonyl, 2-methylsulfonyl-5-nitro-6-methyl-4-pyrimidinyl, 2,5,6-tris (methylsulfonyl)-4-pyrimidinyl, 2-methylsulfonyl-5,6-dimethyl-4-pyridinyl, 2-ethylsulfonyl-5-chloro-6-methyl-4-pyrimidinyl, 2-methylsulfonyl-6-chloro-4-pyrimidinyl, 2,6-bis(methylsulfonyl)-5-chloro-4-pyrimidinyl, 2-methylsulfonyl-6-carbonyl-4-pyrimidinyl,
2-methylsulfonyl-5-sulfo-4-pyrimidinyl, 2-methylsulfonyl-6-carbomethoxy-4-pyrimidinyl, 2-methylsulfonyl-5-carboxy-4-pyrimidinyl, 2-methylsulfonyl-5-cyano-6-methoxy-4-pyrimidinyl, 2-methylsulfonyl-5-chloro-4-pyrimidinyl, 2-sulfoethylsulfonyl-6-methyl-4-pyrimidinyl, 2-methylsulfonyl-5-bromo-4-pyrimidinyl, 2-phenylsulfonyl-5-chloro-4-pyrimidinyl, 2-carboxymethylsulfonyl-5-chloro-6-methyl-4-pyrimidinyl, 2-methylsulfonyl-6-chloropyrimidine-4- and -5-carbonyl, 2,6-bis(methylsulfonyl)pyrimidine-4- or -5-carbonyl, 2-ethylsulfonyl-6-chloropyrimidine-5-carbonyl, 2,4-bis (methylsulfonyl)pyrimidine-5-sulfonyl, 2-methylsulfonyl-4-chloro-6-methylpyrimidine-5-sulfonyl or -carbonyl, ammonium-containing triazine rings, such as 2-trimethylammonio-4-phenylamino- or -4-(o-, m- or p-sulfophenyl)amino-6-triazinyl, 2-(1,1-dimethylhydrazinio)-4-phenylamino- or -4-(o-, m- or p-sulfophenyl)amino-6-triazinyl, 2-(2-isopropylidene-1,1-dimethyl)hydrazinio-4-phenylamino- or -4-(o-, m- or p-sulfophenyl)amino-6-triazinyl, 2-N-aminopyrrolidinio- or 2-aminopiperidinio-4-phenylamino- or -4-(o-, m- or p-sulfophenyl)amino-6-triazinyl, 2-N-aminopyrrolidinio- or 2-N-aminopiperidinio-4-phenylamino- or -4-(o-, m- or p-sulfophenyl)amino-6-triazinyl, furthermore 4-phenylamino- or -4-(sulfophenylamino)-6-triazinyl radicals which contain 1,4-diazabicyclo[2.2.2]octane or 1,2-diazabicyclo[0.3.3]octane bound quaternary in the 2 position via a nitrogen bond, 2-pyridinio-4-phenylamino- or 4-(o-, m- or p-sulfophenyl)amino-6-triazinyl and the corresponding 2-onio-6-triazinyl radicals which are substituted in the 4 position by alkylamino, such as methylamino, ethylamino or β-hydroxyethylamino or alkoxy, such as methoxy or alkoxy, aroxy, such as phenoxy or sulfophenoxy groups: 2-chlorobenzothiazole-5- or -6-carbonyl or -5- or -6-sulfonyl, 2-arylsulfonyl- or alkylsulfonylbenzothiazole-5- or -6-carbonyl or -5- or -6-sulfonyl, such as 2-methylsulfonyl- or 2-ethoxysulfonylbenzothiazole-5- or -6-sulfonyl or -carbonyl, 2-phenylsulfonylbenzothiazole-5- or -6-sulfonyl or -carbonyl and the corresponding 2-sulfonylbenzothiazole-5- or -6-carbonyl or -sulfonyl derivatives containing sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methyl-1,3-thiazole-5-carbonyl or -4- or -5-sulfonyl, the N-oxide of 4-chloro- or 4-nitroquinoline-5-carbonyl or also the radicals 5-chloro-2,6-difluoro-1,3-dicyanophenyl, 2,4-difluoro-1,3,5-tricyanophenyl, 2,4,5-trifluoro-1,3-dicyanophenyl, 2,4-dichloro-5-methylsulfonyl-6-pyrimidinyl, 2,4-trichloro-5-ethylsulfonyl-6-pyrimidinyl, 2-fluoro-5-methylsulfonyl-6'-(2'-sulfophenylamino)-4-pyrimidinyl, 2,5-dichloro-6-methylsulfonyl-6-pyrimidinyl Further reactive groups of the aliphatic series are acrylolyl, mono-, di- or trichloroacryloyl groups, such as
—CO—CH=CH—Cl, —CO—CCl=CH$_2$, —CO—CCl=CH—CH$_3$, furthermore —CO—CCl=CH—COOH, —CO—CH=CCl—COOH, β-chloropropionyl, 3-phenylsulfonylpropionyl, 3-methylsulfonylpropionyl, 2-fluoro-2-chloro-3,3-difluorocyclobutane-1-carbonyl, 2,2,3,3-tetrafluorocyclobutane-1-carbonyl or -1-sulfonyl, 2,2,3,3-tetrafluorocyclobutane-1-aryloxy, α- or β-bromoacrylolyl, α- or β-alkyl or -arylsulfoacrylolyl, such as α- or β-methylsulfonylacrylolyl, and chloroacetyl.

An example of a suitable aliphatic radical $Z_1$ or $Z_2$ in formula (1) is a substituted or unsubstituted $C_1$-$C_8$alkyl radical or a substituted or unsubstituted $C_5$-$C_7$cycloalkyl radical.

Examples of $Z_1$ and $Z_2$ as $C_1$-$C_8$alkyl are methyl, ethyl, propyl, isopropyl, butyl, isobutyl, sec-butyl, tert-butyl, n-pentyl, n-hexyl or n-octyl. The $C_1$-$C_8$alkyl radicals $Z_1$ and $Z_2$ can be substituted, for example by halogen, hydroxyl, cyano, carboxyl, $C_1$-$C_4$alkoxy, $C_2$-$C_4$alkanoyl, hydroxy-$C_2$-$C_4$alkoxy, sulfo, sulfato, phenyl and naphthyl, it being possible for the phenyl or naphthyl radical to be further substituted, for example as mentioned for $A_1$, $A_2$ or $A_3$. Examples are: β-carboxyethyl, β-cyanoethyl, sulfomethyl, β-sulfoethyl, benzyl, phenethyl, β-acetylaminoethyl.

Suitable $C_5$-$C_7$cycloalkyl radicals for $Z_1$ and $Z_2$ are cyclopentyl, cyclohexyl or cycloheptyl radicals, which can be further substituted, for example by $C_1$-$C_4$alkyl. Examples are: cyclopentyl, cyclohexyl, 4-methylcyclohexyl, and cycloheptyl.

Suitable aromatic radicals for $Z_1$ and $Z_2$ are in particular phenyl or naphthyl and phenyl or naphthyl radicals substituted, for example, by $C_1$-$C_4$alkyl, for example methyl, ethyl, n-propyl, isopropyl, n-butyl, $C_1$-$C_4$alkoxy, for example methoxy or ethoxy, halogen, for example fluorine, chlorine or bromine, carboxyl, hydroxyl or sulfo.

Suitable heterocyclic radicals for $Z_1$ and $Z_2$ are in particular a furan, thiophene, pyrazole, pyridine, pyrimidine, quinoline, benzimidazole, benzothiazole or benzoxazole radical, it being possible for the radicals mentioned to be substituted by the substituents mentioned for $A_1$, $A_2$ or $A_3$.

In the case where $Z_1$ and $Z_2$, together with the nitrogen atom linking them, possibly with the inclusion of a further heteroatom, form a nitrogen-containing heterocyclic ring examples are a piperidinyl, piperazinyl or morpholinyl radical.

Preferred dye mixtures of the reactive dyes of the formulae (1) and (2) are those in which a) $A_1$, $A_2$, $A_3$, $Z_1$ and $Z_2$, independently of one another, contain fibre-reactive radicals, b) the weight ratio of the dyes of the formulae (1):(2) is 5:95 to 95:5, in particular 30:70 to 70:30, c) B is —(CH$_2$)—$_{2-6}$, unsubstituted or $C_1$-$C_4$alkyl-substituted cyclohexylene, unsubstituted or substituted phenylene or a radical of the formula

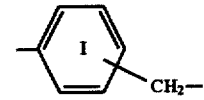

in which the benzene ring I can contain further substituents, in particular B is —(CH$_2$)—$_{2-6}$, preferably ethylene, or

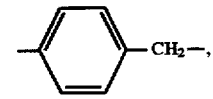

d) the radical —N(Z$_1$)Z$_2$ is —NH$_2$,

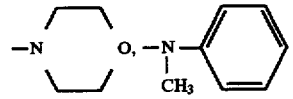

or —NH—(CH$_2$)$_2$—NH—CO—CH$_3$, e) $X_1$, $X_2$ and $X_3$, independently of one another, are fluorine or chlorine, in particular fluorine, f) $R_1$, $R_2$, $R_3$, $R_4$ and $R_5$, independently of one another, are hydrogen, methyl or ethyl, $R_3$ and $R_4$ being in particular hydrogen, g) $A_1$, $A_2$ and $A_3$, independently of one another, are monoazo or disazo dye radicals, metal complex azo dye radicals or formazan dye radicals, h) the radicals $A_2$ and $A_3$ are identical, i) the radicals $A_1$, $A_2$ and $A_3$ are identical.

Preferred reactive dyes of the formula (2a) are those in which a) $A_2$ and $A_3$, independently of one another contain fibre-reactive radicals, b) $B_1$ is $-(CH_2)_{\overline{2-6}}$, unsubstituted or $C_1$-$C_4$alkyl-substituted cyclohexylene, in particular $B_1$ is $-(CH_2)_{\overline{2-6}}$, preferably ethylene, c) $X_2$ and $X_3$, independently of one another, are fluorine or chlorine, in particular fluorine, d) $R_2$, $R_3$, $R_4$ and $R_5$, independently of one another, are hydrogen, methyl or ethyl, $R_3$ and $R_4$ being in particular hydrogen, e) $A_2$ and $A_3$, independently of one another, are monoazo or disazo dye radicals, metal complex azo dye radicals, or formazan dye radicals, f) the radicals $A_2$ and $A_3$ are identical.

Particularly preferred dye mixtures of the reactive dyes of the formulae (1) and (2) are those in which a) $X_1$, $X_2$ and $X_3$ are fluorine, b) $R_3$ and $R_4$ are each a hydrogen atom, c) the benzene ring I is unsubstituted or substituted by sulfo, d) $A_2$ has the same meaning as $A_3$ and $R_2$ the same meaning as $R_5$, e) $A_1$, $A_2$ and $A_3$ are each an azo, metal complex azo or formazan dye radical.

Of particular importance are dye mixtures of the reactive dyes of the formulae (1) and (2) or dyes of the formula (2a) in which $A_1$, $A_2$ and $A_3$, or $A_2$ and $A_3$ (in the case of the dyes of the formula (2a)) are each a radical of the formulae (3) to (15) below:

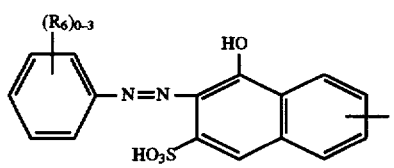

(3)

in which $R_6$ represents 0 to 3 substituents from the group comprising $C_1$-$C_4$alkyl, $C_1$-$C_4$alkoxy, halogen, carboxyl and sulfo.

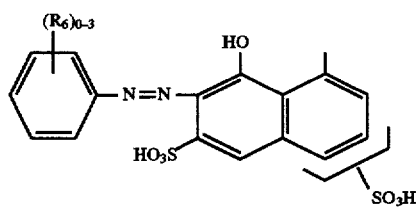

(4)

in which $R_6$ represents 0 to 3 substituents from the group comprising $C_1$-$C_4$alkyl, $C_1$-$C_4$alkoxy, halogen, carboxyl and sulfo.

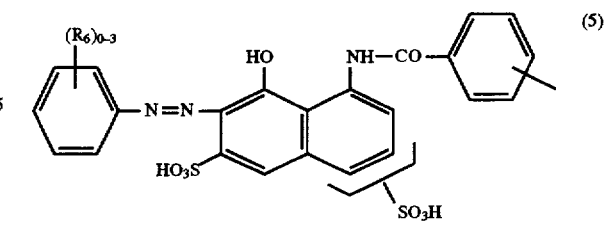

(5)

in which $R_6$ represents 0 to 3 substituents from the group comprising $C_1$-$C_4$alkyl, $C_1$-$C_4$alkoxy, halogen, carboxyl and sulfo.

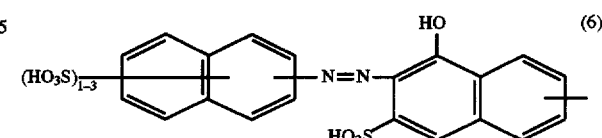

(6)

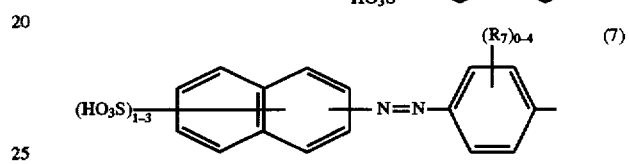

(7)

in which $R_7$ represents 0 to 4 substituents from the group comprising halogen, nitro, cyano, trifluoromethyl, sulfamoyl, carbamoyl, $C_1$-$C_4$alkyl, $C_1$-$C_4$alkoxy, amino, acetylamino, ureido, hydroxyl, carboxyl, sulfomethyl and sulfo independently of one another.

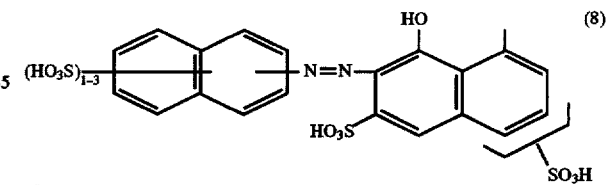

(8)

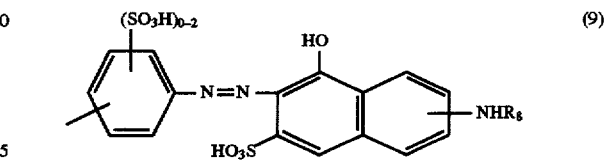

(9)

in which $R_8$ is $C_1$-$C_4$alkanoyl or benzoyl.

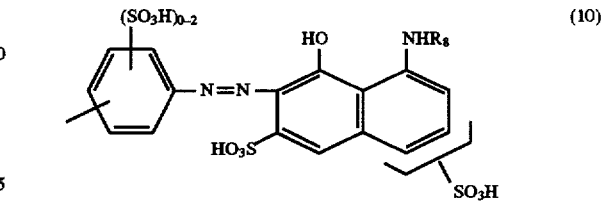

(10)

in which $R_8$ is $C_1$-$C_4$alkanoyl or benzoyl.

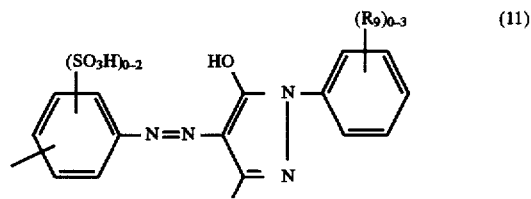

(11)

in which $R_9$ represents 0 to 3 substituents frown the group comprising $C_1$–$C_4$alkyl, $C_1$–$C_4$alkoxy, halogen, carboxyl and sulfo.

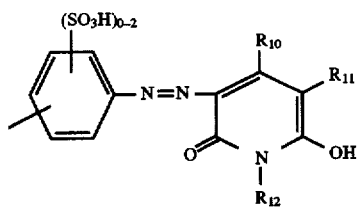

(12)

in which $R_{12}$ and $R_{10}$, independently of one another, are hydrogen, $C_1$–$C_4$alkyl or phenyl, and $R_{11}$ is hydrogen, cyano, carbamoyl or sulfomethyl.

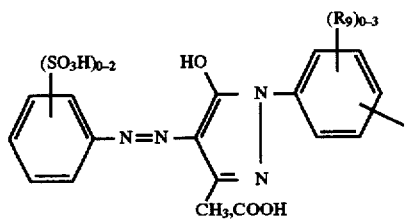

(13)

in which $R_9$ represents 0 to 3 substituents from the group comprising $C_1$–$C_4$alkyl, $C_1$–$C_4$alkoxy, halogen, carboxyl and sulfo.

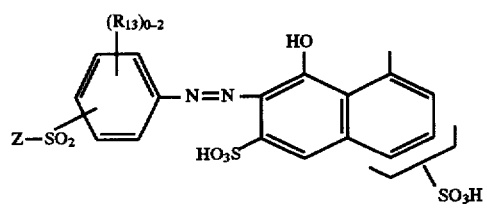

(14)

in which $R_{13}$ represents 0 to 2 substituents from the group comprising $C_1$–$C_4$alkyl, $C_1$–$C_4$alkoxy, halogen, carboxyl and sulfo; and Z is β-sulfatoethyl, β-thiosulfatoethyl, β-phosphatoethyl, β-acyloxyethyl, β-haloethyl or vinyl.

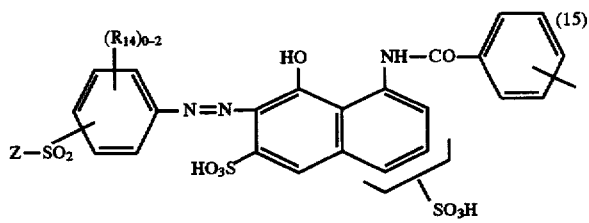

(15)

in which $R_{14}$ represents 0 to 2 substituents from the group comprising $C_1$–$C_4$alkyl, $C_1$–$C_4$alkoxy, halogen, carboxyl and sulfo; and Z is β-sulfatoethyl, β-thiosulfaoethyl, β-phosphatoethyl, β-acyloxyethyl, β-haloethyl or vinyl.

Furthermore, of particular importance are heavy metal complexes of reactive dyes of the formula (1); suitable complexing heavy metals are in particular copper, nickel, cobalt or chromium. Preference is given to copper complex azo dyes, in particular those of the formulae (3) to (13) which contain the copper atom bound in the ortho position relative to the azo bridge via an oxygen atom.

Examples of azo dyes which are suitable as metal complexes are:

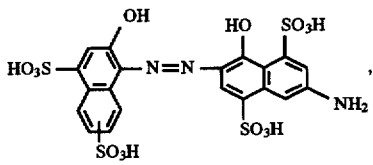

(16)

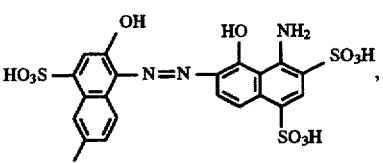

(17)

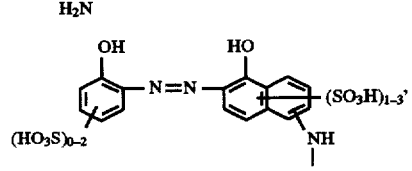

(18)

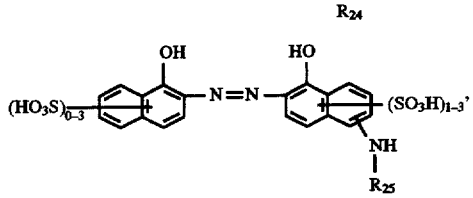

(19)

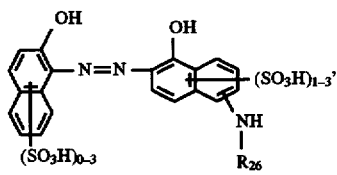

(20)

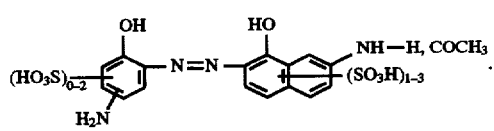

(21)

Preferred metal atoms are Cu (1:1 complex) or Cr and Co (1:2 complex). Cr and Co complexes can contain the azo compound of the abovementioned formula once or twice, i.e. they can have a symmetrical or, together with any desired other ligands, an unsymmetrical structure.

Preference is given to copper complexes, for example

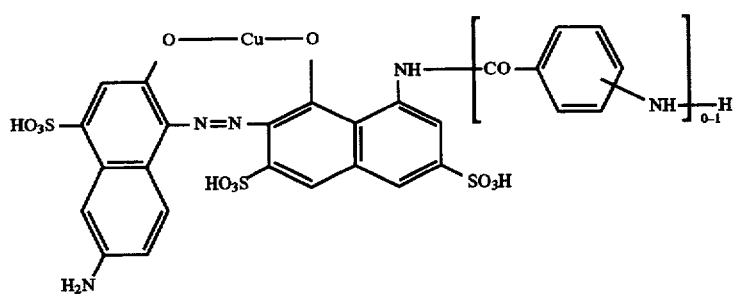

(22)

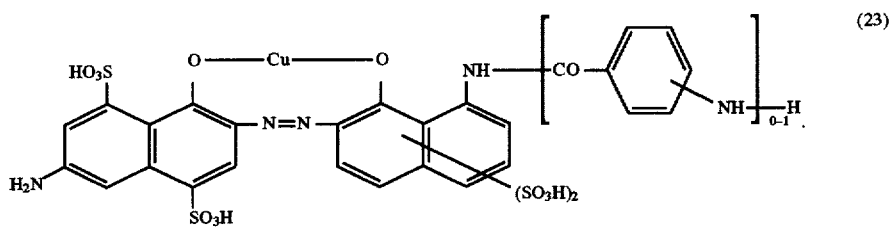

In the formulae listed above, the radicals $R_{24}$ to $R_{26}$ are hydrogen or $C_1-C_4$alkyl. The radicals $R_{24}$ to $R_{26}$ are preferably hydrogen, methyl or ethyl. The aromatic rings in the above dyes can be further substituted, tile benzene rings in particular by methyl, ethyl, methoxy, ethoxy, methylsulfonyl, ethylsulfonyl, carboxyl, acetylamino or chlorine, and the naphthalene rings in particular by methoxy, carboxyl, acetylamino, nitro or chlorine. Preferably, the benzene rings are not further substituted.

The reactive dyes of the formulae (1), (2) and (2a) are known per se or can be prepared by reacting one or two equivalents of an organic dye of the formula

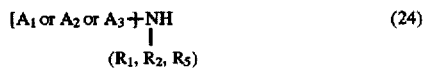

or a dye precursor, at least one equivalent of an s-triazine, at least one equivalent of a diamine of the formula

or of the formula

or one equivalent of an amine of the formula

with one another in any desired order, $A_1, A_2, A_3, R_1, R_2, R_3, R_4, R_5, B, B_1, Z_1$ and $Z_2$ being as defined in formulae (1), (2) and (2a), or, in the case where dye precursors are used, converting the intermediates obtained into the desired dyes and, if desired subsequently carrying out a further conversion reaction.

The final dyes are prepared from the precursors in particular by coupling reactions, which lead to azo dyes.

Since the individual abovementioned process steps can be carried out in a different order, if desired even simultaneously in some cases, various process variants are possible. In general, the reaction is carried out in successive steps, the sequence of the simple reactions between the individual reactants advantageously depending on the specific conditions.

Which of the possible process variants give the best results or under which specific conditions, for example at which condensation temperature, it is most advantageous to carry out the reaction, depends on the structure of the starting materials. Since under certain conditions hydrolysis of a halotriazine radical takes place, an intermediate containing acetylamino groups has to be hydrolysed, in order to remove the acetyl groups, before it is condensed with a halotriazine. Which reaction, for example when a secondary condensation product is prepared from a compound of the formula (25), the triazine and the dye of the formula (24) or a precursor, is advantageously carried out first, the reaction of the triazine with the compound of the formula (25) or with the dye or a precursor of the dye, differs from case to case and depends in particular on the solubility of the amino compounds involved and the basicity of the amino groups to be acylated.

Possible starting materials which can be used for preparing the reactive dyes of the formulae (1), (2) and (2a) are mentioned in detail below.

Dyes of the formula (24)

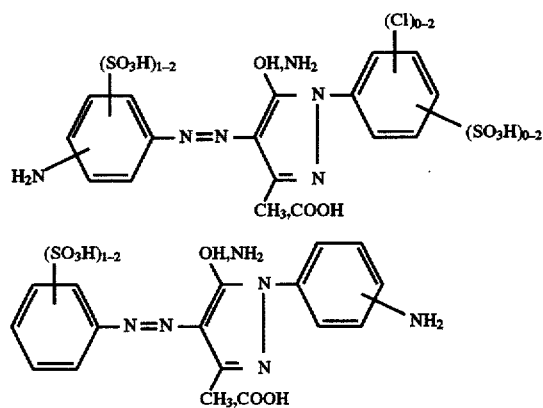

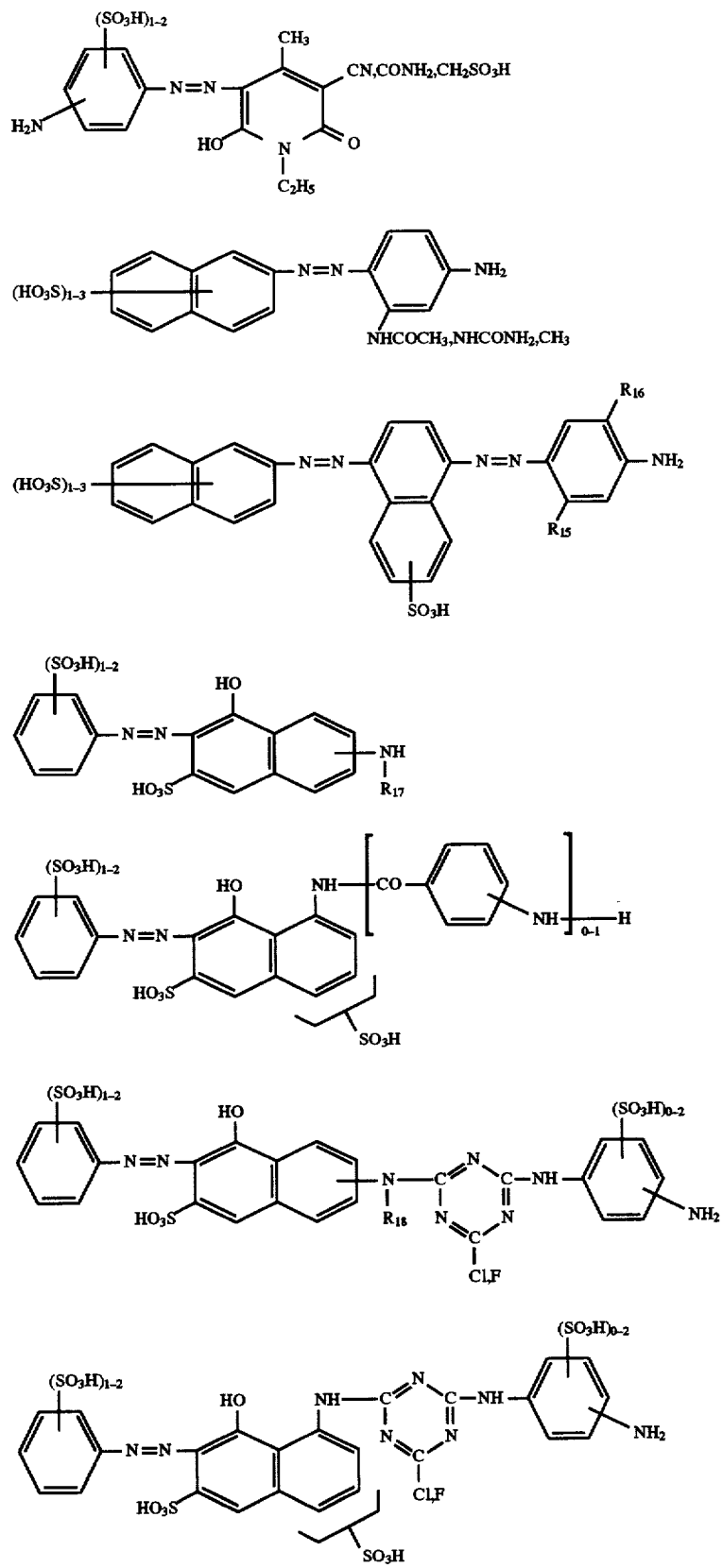

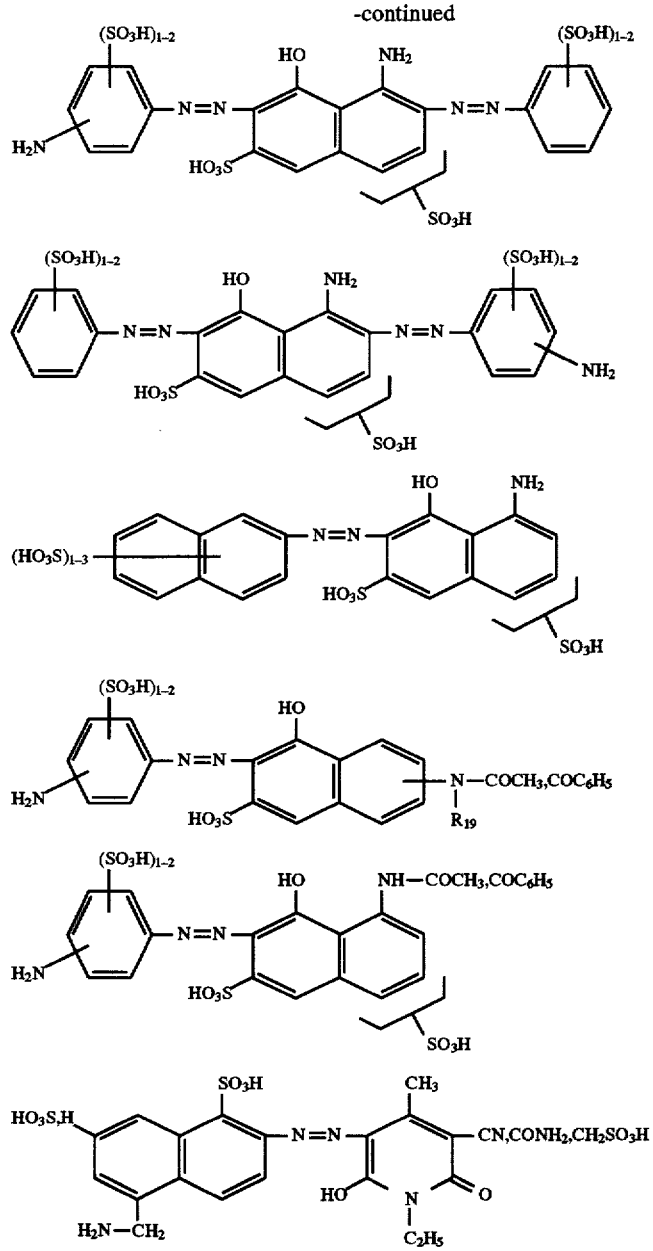
Metal complexes of dyes of the formulae:
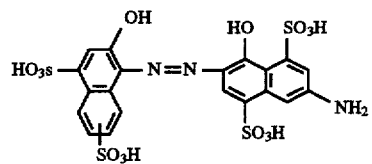
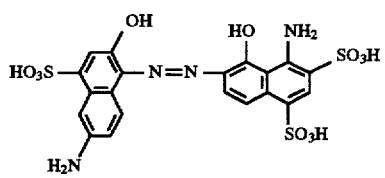
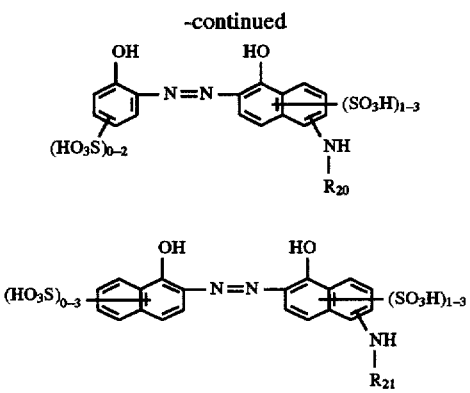

-continued

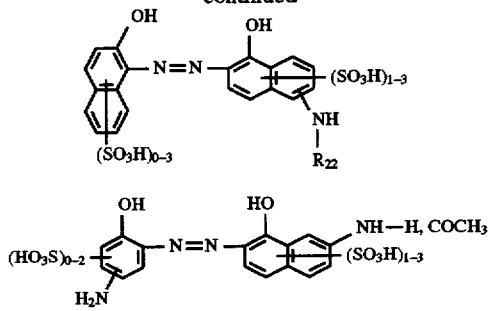

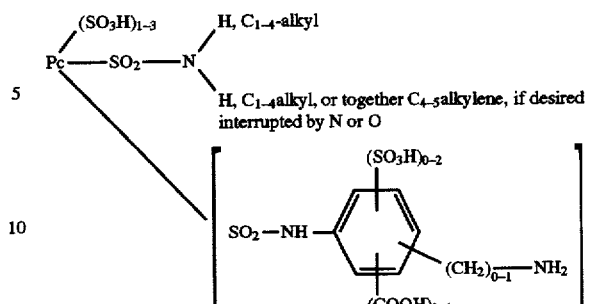

Preferred metal atoms are Cu (1:1 complex) or Cr and Co (1:2 complex). Cr and Co complexes can contain the azo compound of the abovementioned formula once or twice, i.e. they can have a symmetrical or, together with any desired other ligands, an unsymmetrical structure.

In this formula, Pc is a Cu- or Ni-phthalocyanine radical, while the total number of substituents on the Pc structure is 4.

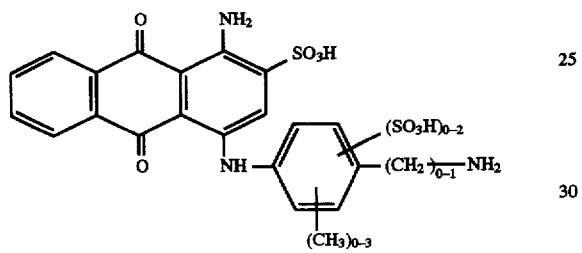

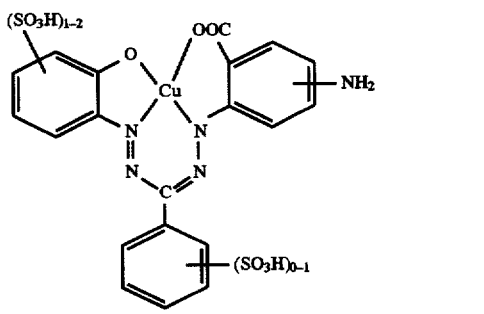

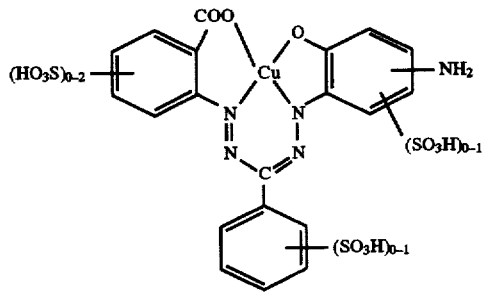

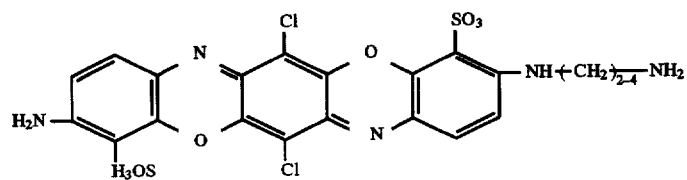

In the formulae listed above, the radicals $R_{17}$ to $R_{22}$ are hydrogen or $C_1-C_4$alkyl, and the radicals $R_{15}$ and $R_{16}$ are hydrogen, $C_1-C_4$alkyl, $C_1-C_4$alkoxy, $C_1-C_4$alkanoylamino, ureido or halogen, the radicals $R_{15}$ and $R_{16}$, belonging to one and the same formula being independent of one another. The radicals $R_{17}$ to $R_{22}$ are preferably hydrogen, methyl or ethyl, and the radicals $R_{15}$ and $R_{16}$ hydrogen, methyl, ethyl, methoxy, ethoxy, acetylamino, ureido or chlorine. The aromatic rings in the above dyes can be further substituted, the benzene rings in particular by methyl, ethyl, methoxy, ethoxy, methylsulfonyl, ethylsulfonyl, carboxyl, acetylamino or chlorine, and the naphthaline rings in particular by methoxy, carboxyl, acetylamino, nitro or chlorine; the same applies to the anthraquinones, dioxazines, and the like. Preferably, the benzene rings are not further substituted. Suitable triazines are 2,4,6-Trifluoro-s-triazine (cyanuric fluoride), 2,4,6-trichloro-s-triazine (cyanuric chloride), 2,4,6-tribromo-s-udazine (cyanuric bromide), 2,4,6-trisulfo-s-triazine Diamines of formula (25)

4-Aminomethyl-3-sulfoaniline, 4-aminomethyl-2-sulfoaniline, 1,2-diaminoethane, 1,3-diaminopropane, 1,2- or 1,3- or 1,4-diaminobenzene Amines of the formula (26)

Ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-(acetylamino)ethylamine, β-sulfatoethylamine, benzylamine, phenethylamine, cyclohexylamine, N-propylaminobenzene, N-isopropylaminobenzene, N-butylaminobenzene, N-isobutylaminobenzene, N-sec-butylaminobenzene, N-hexylaminobenzene, N-β-hydroxyethylaminobenzene, N-β-chloroethylaminobenzene, N-β-cyanoethylaminobenzene, N-β-sulfoethylaminobenzene, 1-(N-ethylamino)-2-3- or -4-methylbenzene, 1-(N-ethylamino)-2-, -3- or -4-ethylbenzene, 1-(N-ethylamino)-2-, -3- or -4-chlorobenzene, 1-N-ethylaminobenzene-3- or -4-sulfonic acid, 1-(N-ethylamino)-4-butylbenzene, 1-(N-ethylamino)-4-hexylbenzene, 1-(N-ethylamino)-4-octylbenzene, 1-(N-ethylamino)-4-vinylbenzene, 1-N-n-butylamino-3-methylbenzene, 1-(N-ethylamino)-4-fluorobenzene, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, 2,5-dimethoxyaniline, o-, m- and p-anisidine, o-, m- and p-phenetidine, 2-methoxy-5-methylaniline, 2-ethoxy-5-methoxyaniline, 4-bromoaniline, 3-aminobenzamide, 4-aminophenylsulfamide, 3-trifluoromethylaniline, 3- and 4-aminophenylsulfamide, 3-trifluoromethylaniline, 3- and 4-aminophenylurea, 1-naphthylamine, 2-naphthylamine, orthanilic acid, metanilic acid, sulfanilic acid, aniline-2,4-disulfonic acid, aniline-2,5-disulfonic acid, aniline-3,5-disulfonic acid, anthranilic acid, m- and p-aminobenzoic acid, 4-aminophenylmethanesulfonic acid, anilene-N-methanesulfonic acid, 2-aminotoluene-4-sulfonic acid, 2-aminotoluene-5-sulfonic acid, p-aminosalicylic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamino-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8- and -4,6,8-trisulfonic acid, 2-naphthylamine-1,3,7-, -1,5,7-, -3,5, 7-, -3,6,7-, -3,6,8- and -4,6,8-trisulfonic acid, 2-, 3- and 4-aminopyridine, 2-aminobenzothiazole, 5-, 6- and 8-aminoquinoline, 2-aminopyrimidine, morpholine, piperidine, piperazine.

The dye mixture according to the invention can be prepared by mixing the individual dyes. This mixing process is carried out, for example, in suitable mills, for example ball and pinned disc mills, and in kneaders or mixers.

Furthermore, the dye mixtures can be prepared by spray drying the aqueous dye mixtures.

The invention furthermore relates to a process for the dyeing and printing of cellulose-containing fibre materials using dye mixtures containing the reactive dyes of the formulae (1) and (2) and using dyes of the formula (2a). Examples of suitable fibre materials are natural cellulose fibres, such as cotton, linen and hemp, and cellulose and regenerated cellulose. The dye mixtures are also suitable for the dyeing or printing of hydroxyl-containing fibres present in blended fabrics, for example cotton blends with polyamide fibres or in particular polyester fibres.

The dye mixtures according to the invention can be applied to the fibre material and fixed on the fibre in various ways, in particular in the form of aqueous dye solutions and printing pastes. They are suitable for dyeing not only by the exhaust method but also by the padding method, in which the material is impregnated with aqueous dye solutions which may contain salts and the dyes are fixed after an alkali treatment or in the presence of alkali, if desired with the application of heat. After fixing, the dyeings or prints are thoroughly rinsed with cold and hot water, if desired with the addition of an agent acting as a dispersant and promoting the diffusion of the unfixed portions. For dyeing and printing, the customary dyeing and printing processes are used.

The dye mixtures are distinguished by good fixation properties and very good build-up properties. They can be used by the exhaust method over a very wide temperature range and are therefore also highly suitable for dyeing cotton/polyester blended fabrics under the conditions recommended for fabrics of this type. The degrees of fixation are high, and the difference between the degree of exhaustion and the degree of fixation is remarkably small, i.e. the soaping loss is very low. The dye mixtures of the reactive dyes of the formulae (1) and (2), and the dyes of the formula (2a) are also suitable for printing, in particular on cotton, but also for printing nitrogen-containing fibres, for example wool or silk or blended fabrics containing wool or silk.

The dyeings and prints on cellulose fibre materials produced using the dye mixtures according to the invention have a high colour strength and a high stability of the dye/fibre linkage, not only in the acidic but also in the alkaline range, furthermore good light fastness and very good wet fastness properties, such as wash, water, sea water, cross-dyeing and perspiration fastness properties, and good pleating fastness, hot press fastness and rub fastness and very good chlorinated water fastness.

The dyes of the formulae (1), (2) and (2a) are present either in the form of their free sulfonic acid or preferably as salts thereof, for example alkali metal salts, alkaline earth metal salts or ammonium salts or as salts of an organic amine. Examples are the sodium salts, lithium salts or ammonium salts or the salt of triethanolamine.

The examples which follow serve to illustrate the invention. The temperatures are given in degrees centigrade, and pans and percentages are by weight, unless stated otherwise. Parts by weight relate to parts by volume as the kilogram relates to the liter.

The preparation of the monoazo or disazo intermediates is not described in the exemplary embodiments which follow, but it follows easily from the general description.

EXAMPLE 1

In order to prepare the dye mixtures containing a dye of the formula

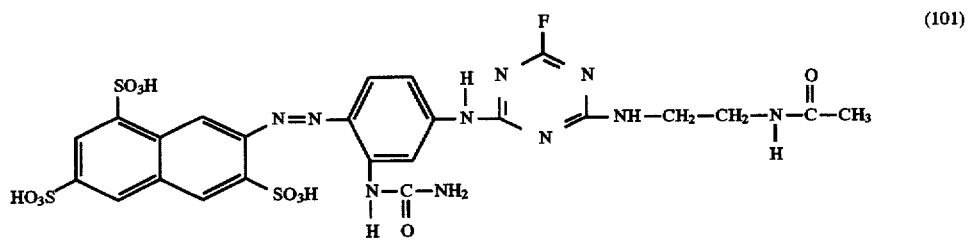

(101)

and a dye of the formula (102), in a mixer (102) 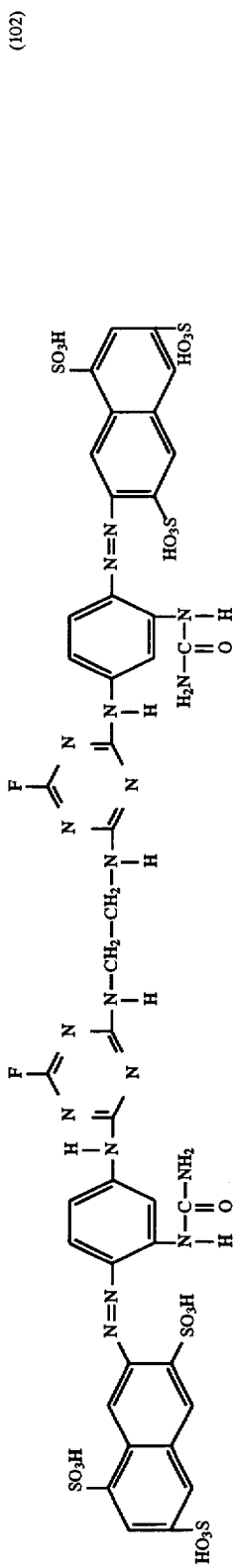
(104) 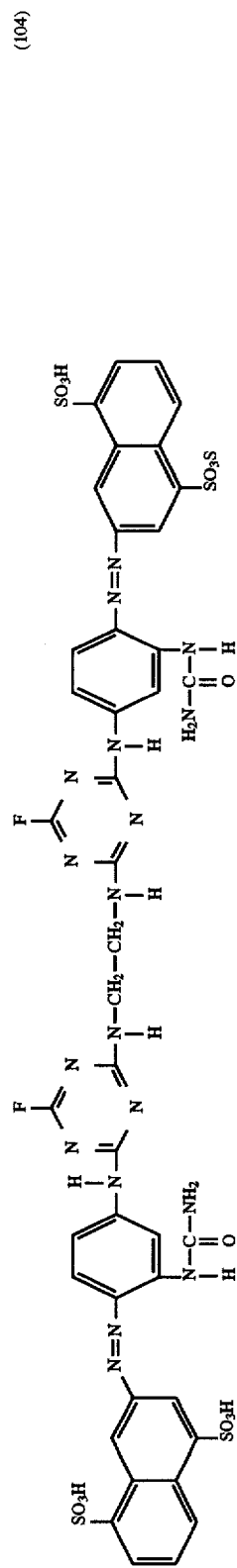
(106) 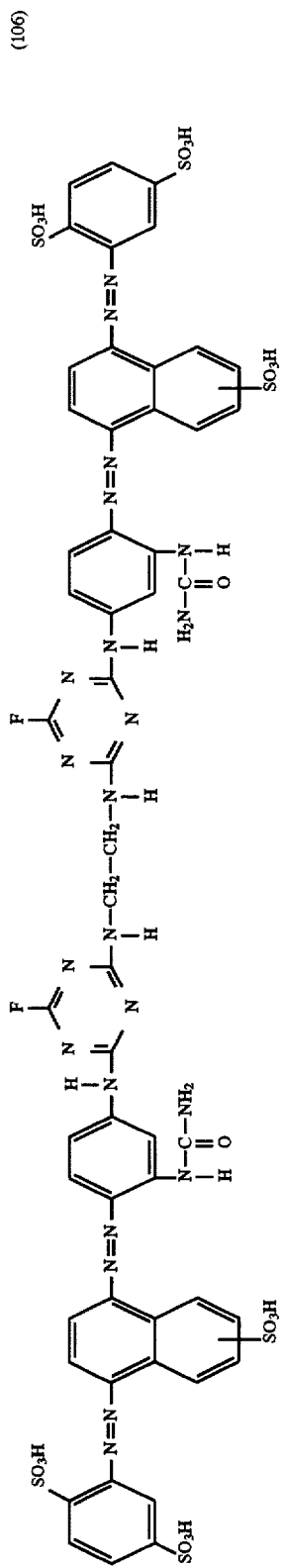

a₁) 40 parts of the dye of the formula (101) and 60 parts of the dye of the formula (102) are mixed homogeneously in a mixer, to give 100 parts of the mixture designated below as dye mixture $A_1$;

a₂) 5 parts of the dye of the formula (101) and 95 parts of the dye of the formula (102) are mixed homogeneously, to give 100 parts of the mixture designated below as dye mixture $A_2$;

a₃) 10 parts of the dye of the formula (101) and 90 parts of the dye of the formula (102) are mixed homogeneously, to give 100 parts of the mixture designated below as dye mixture $A_3$;

in order to prepare the dye mixture containing the dye of the formula

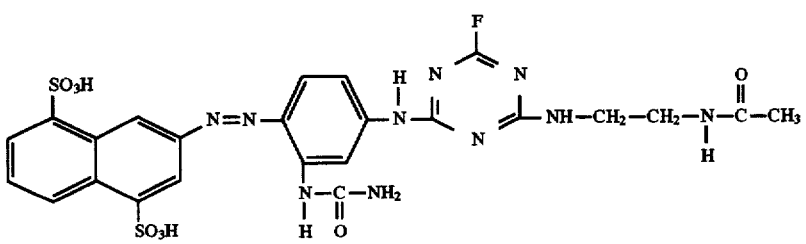

(103)

and the dye of the formula (104), b) 20 parts of the dye of the formula (103) and 80 parts of the dye of the formula (104) are mixed homogeneously;

in order to prepare the dye mixture containing the dye of the formula

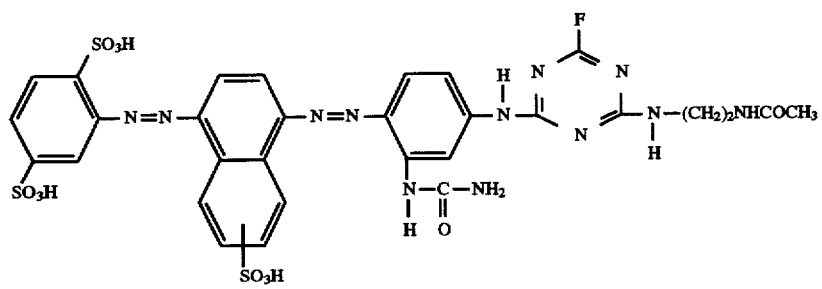

(105)

and the dye of the formula (106), in a mixer c) 20 parts of the dye of the formula (105) and 80 parts of the dye of the formula (106) are homogeneously mixed;

in order to prepare the dye mixture containing the dye of the formula

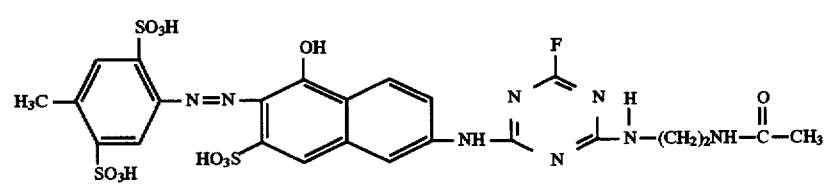

(107)

and the dye of the formula

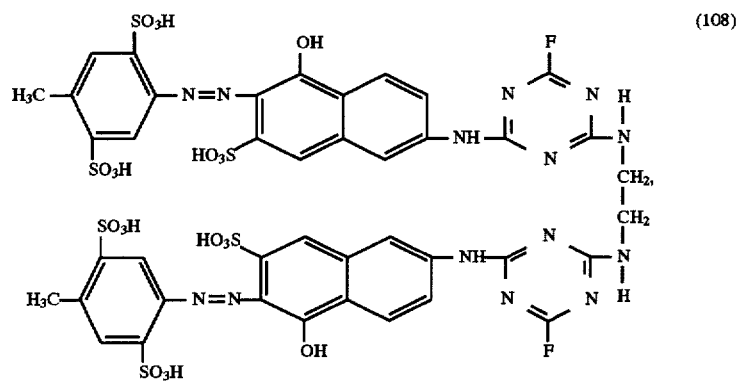
(108)

in a mixer, d) 20 parts of the dye of the formula (107) and 80 parts of the dye of the formula (108) are homogeneously mixed, to give 100 parts of the mixture designated below as dye mixture D;

in order to prepare the dye mixture containing the dye of the formula e) 20 parts of the dye of the formula (109) and 80 parts of the dye of the formula (110) are homogeneously mixed;

in order to prepare the dye mixture containing the dye of the formula

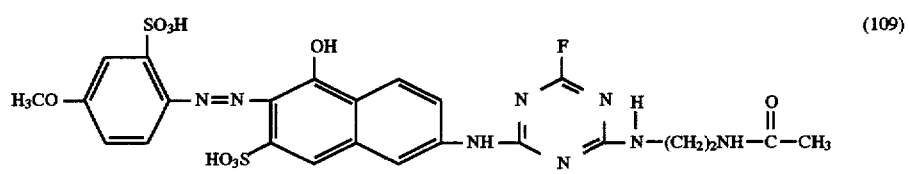
(109)

and the dye of the formula

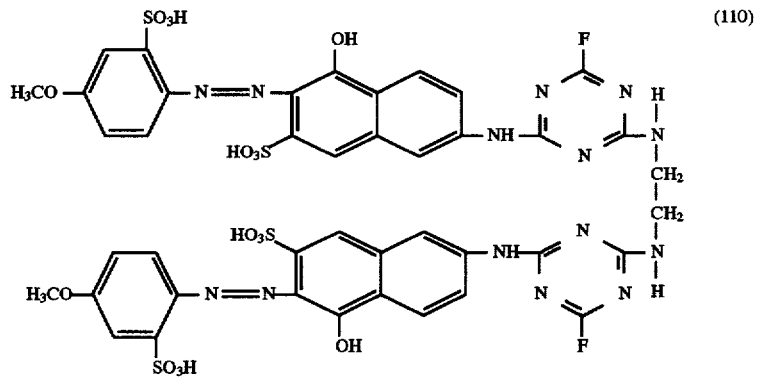
(110)

a mixer,

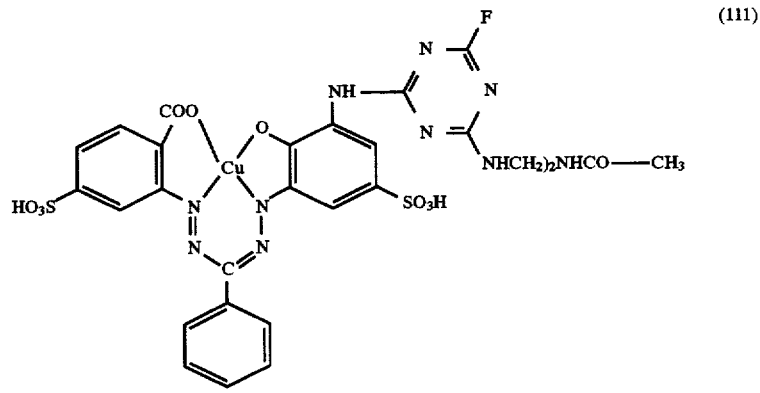

and the dye of the formula

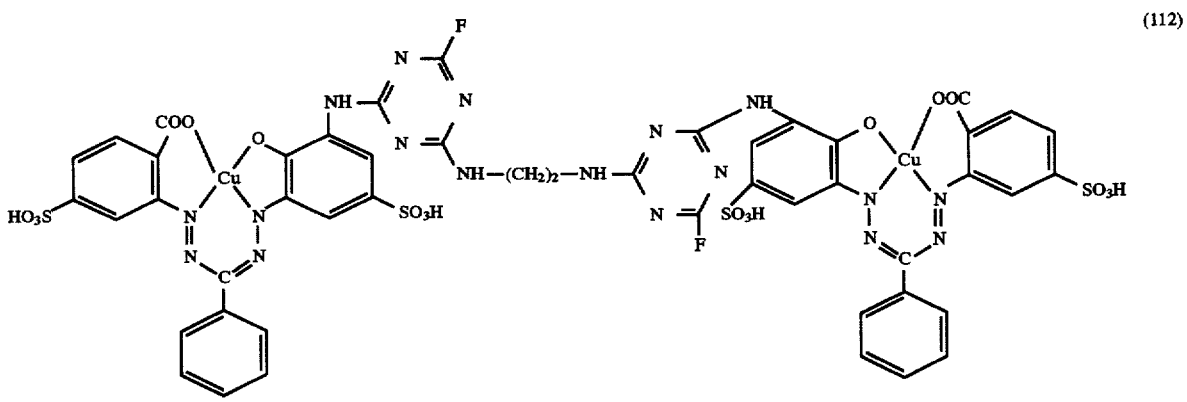

a mixer, f) 30 parts of the dye of the formula (111) and 70 parts of the dye of the formula (112) are homogeneously mixed, to give 100 parts of the mixture designated below as dye mixture F.

EXAMPLE 2

27.3 parts of the dye of the formula

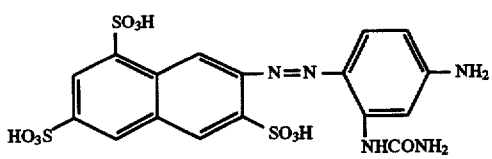

(113)

are dissolved in 600 parts by volume of water and condensed with 7 parts of 2,4,6-trifluoro-1,3,5-triazine. When no more diazotisable amino groups can be detected, an aqueous solution containing 1.6 parts of 2,4-diaminotoluene and 2.2 parts of morpholine are added to the dye solution at 0° to 5° and a pH of 4.5. The pH of the reaction mixture is then increased to 7.5 by addition of sodium carbonate and the temperature is slowly raised to 25°. After condensation is complete, a mixture of the dyes of the formulae

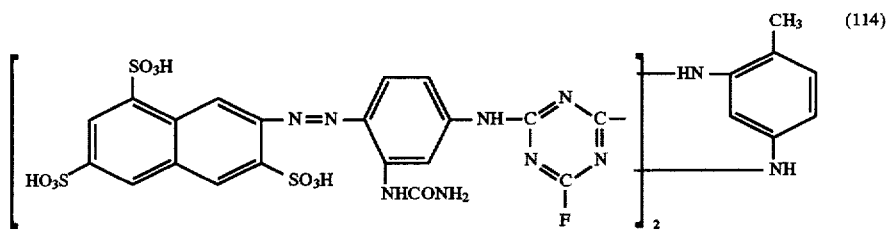

and

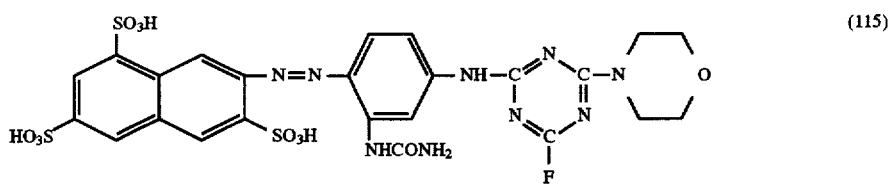

is, after adding buffer salts, precipitated using sodium chloride, filtered, washed and dried. It is an orange powder and dyes cotton in golden yellow shades.

EXAMPLE 3

27.3 parts of the dye of the formula

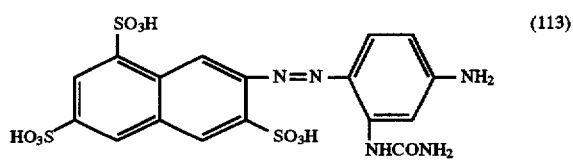

are dissolved in 600 parts by volume of water and condensed with 7 parts of 2,4,6-trifluoro-1,3,5-triazine. When no more diazotisable amino groups can be detected, 0.75 part of ethylenediamine and 2,2 parts of morpholine are added to the dye solution at 0° to 5° and a pH of 5–7. The pH of the reaction mixture is then increased to 7.5 by addition of sodium carbonate and the temperature is slowly raised to 25°. After condensation is complete, a mixture of the dyes of the formulae

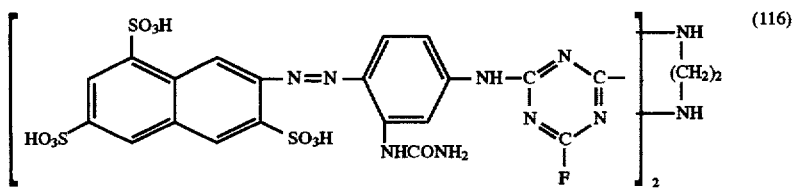

and

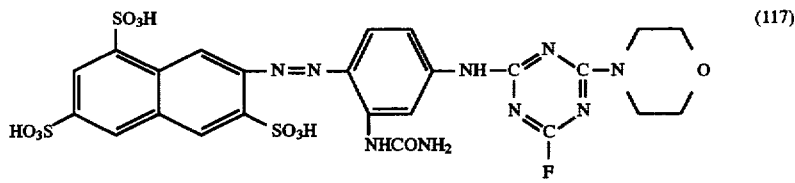

is, after adding buffer salts, precipitated using sodium chloride, filtered, washed and dried. It is an orange powder and dyes cotton in golden yellow shades.

The example is repeated, using 5.8 parts of metanilic acid, 2.7 parts of o-toluidine, 2.7 parts of N-methylaniline or 3.0 parts of N-ethylaniline instead of 2.2 parts of morpholine, to give mixtures of the dye of the formula

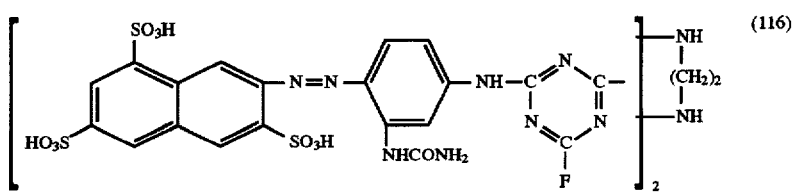

with one of the dyes of the following formulae

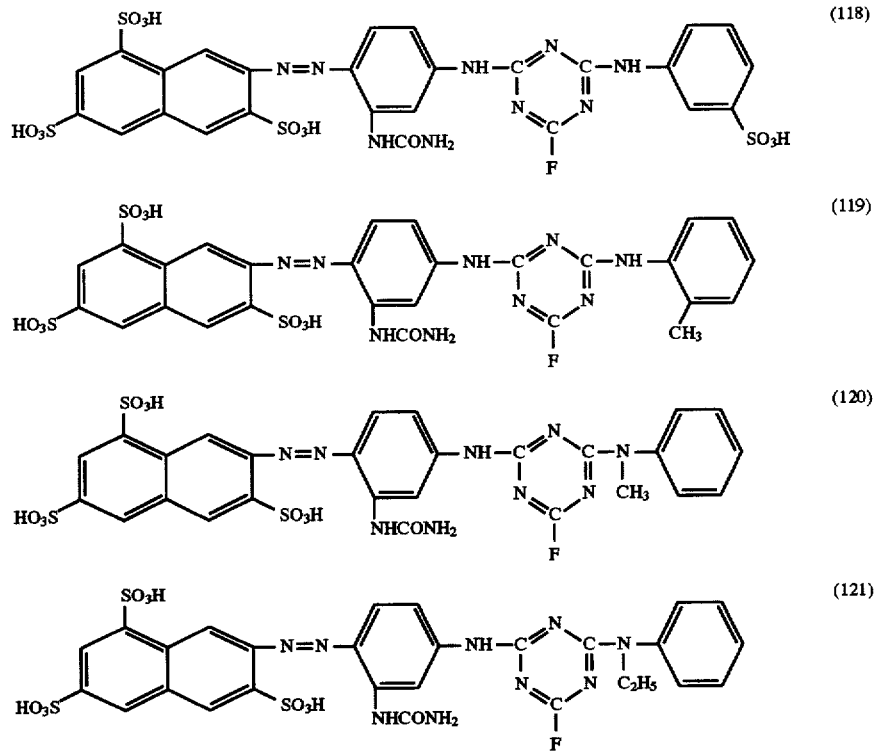

Depending on the molar ratios of the amines or diamines used, dye mixtures having different mixing ratios are obtained.

For example, the following diamines can be used instead of ethylenediamine: 1,3-propylenediamine, 1,2-propylenediamine, n-butylenediamine, 1-methyl-n-propylenediamine, n-hexylenediamine, 2-ethyl-n-butylenediamine, 2-hydroxy-n-propylenediamine, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diamino-naphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl(benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl(diphenylene), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyloxide, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, piperazine.

The procedure as described in the examples is repeated, using the chromophores listed in column I of the table below instead of the abovementioned chromophore, to give further dye mixtures dyeing cotton in the shades given in column II.

| I | II |
|---|---|
| (structure: toluene with 2,5-diSO₃H, azo-linked to 1-hydroxy-6-amino-3-sulfonaphthalene) | scarlet |
| (structure: toluene with 2,5-diSO₃H, azo-linked to 4-hydroxy-5-amino-naphthalene-2,7-disulfonic acid with 3-SO₃H) | red |
| (structure: benzene with 2,5-diSO₃H, azo-linked to 4-hydroxy-5-amino-naphthalene-2,7-disulfonic acid with 3-SO₃H) | red |
| (Cu complex: H₂N-phenyl-COO-Cu-O-phenyl(diSO₃H) with N=N-C(=N-N)-phenyl-SO₃H bridging ligand) | blue |
| (structure: 4-methoxy-2-sulfophenyl azo-linked to 1-hydroxy-6-amino-3-sulfonaphthalene) | scarlet |
| (pyridone structure: H₂NCO, CH₃, N-C₂H₅, OH, azo to 2-SO₃H-5-NH₂-phenyl) | greenish yellow |
| (pyridone structure: HO₃SCH₂, CH₃, N-C₂H₅, OH, azo to 2-SO₃H-5-NH₂-phenyl) | greenish yellow |

-continued
| I | II |
|---|---|
| 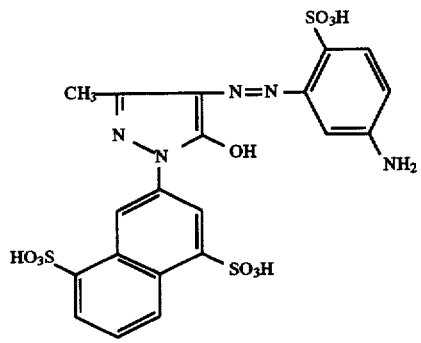 | yellow |
| 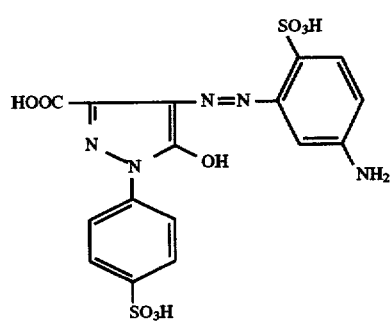 | yellow |
| 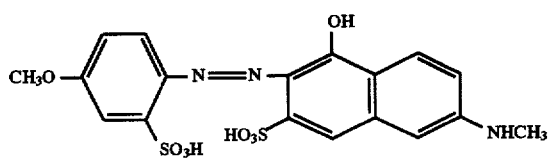 | scarlet |
| 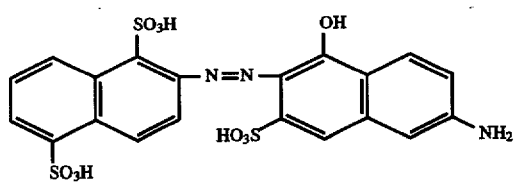 | orange |
| 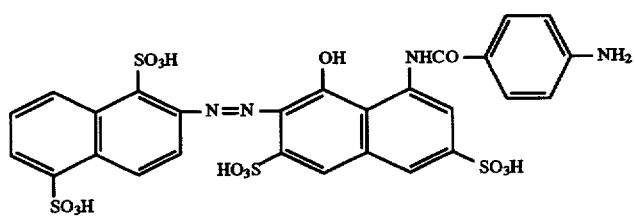 | bluish red |
| 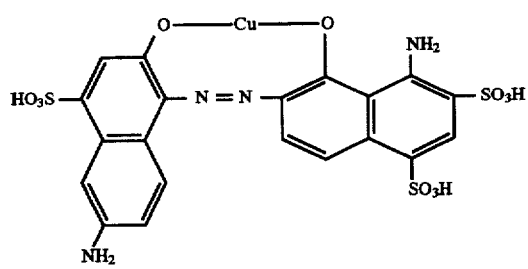 | blue |

-continued
| I | II |
|---|---|
| 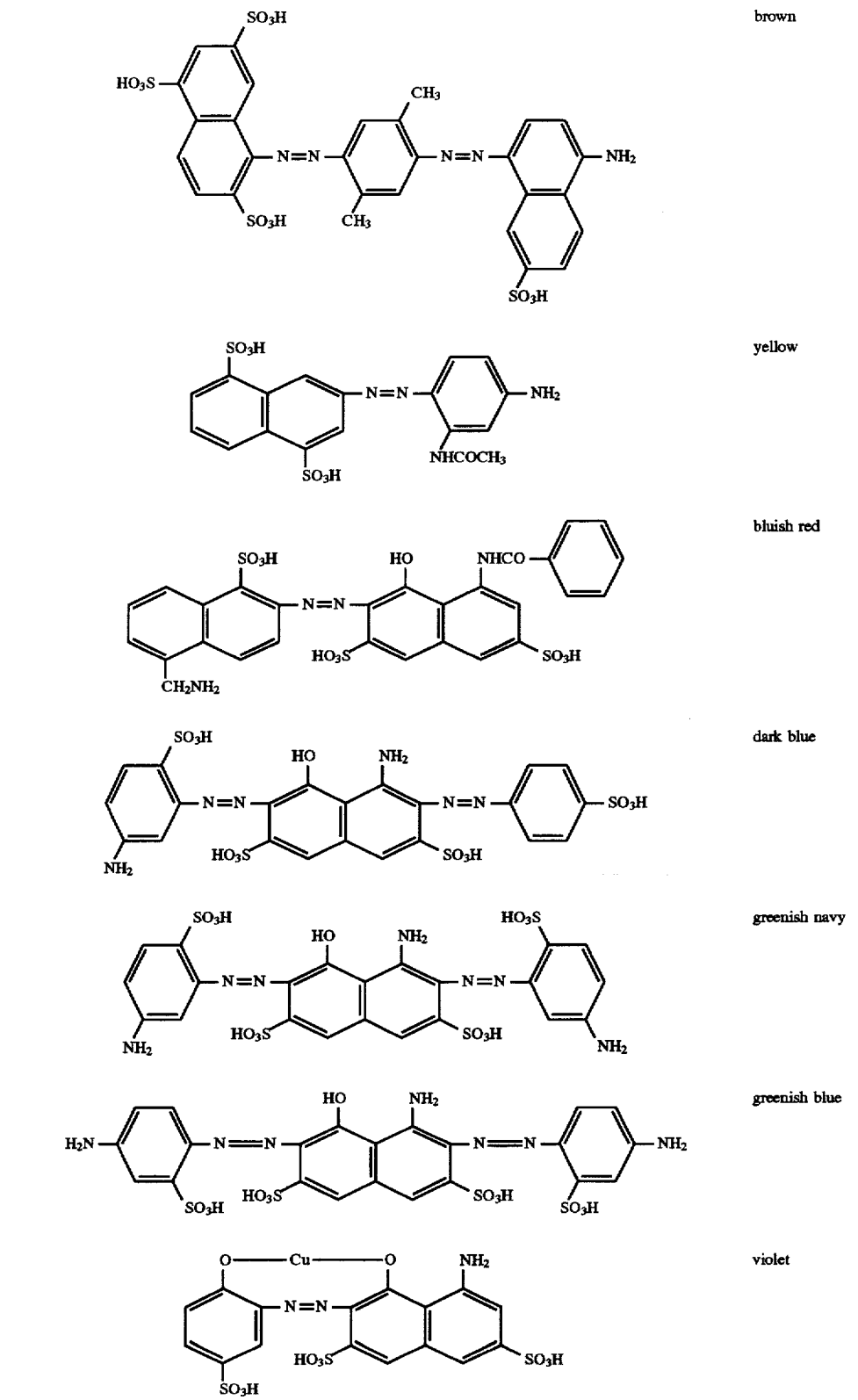 | brown |
| | yellow |
| | bluish red |
| | dark blue |
| | greenish navy |
| | greenish blue |
| | violet |

-continued
| I | II |
|---|---|
| 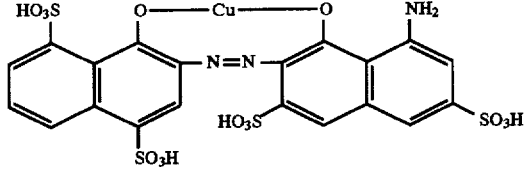 | blue |
| 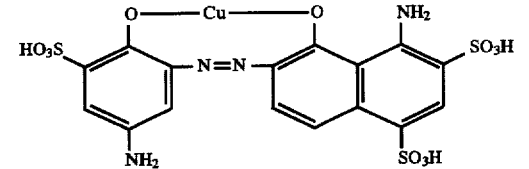 | reddish blue |
| 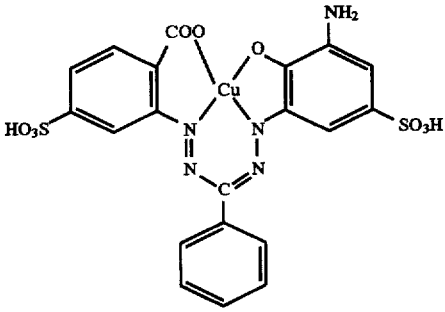 | blue |
| 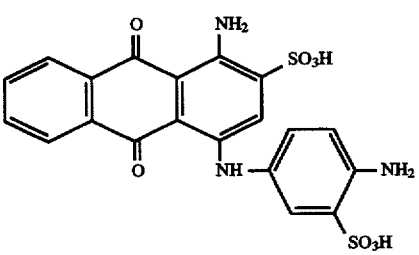 | greenish blue |
| 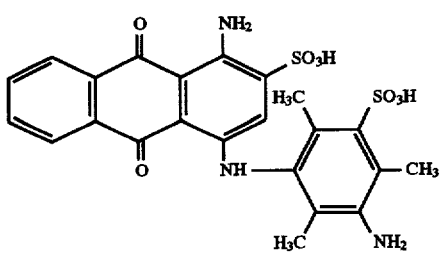 | cobalt blue |
| 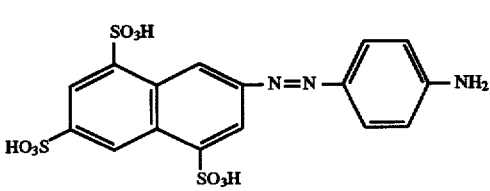 | yellow |
| 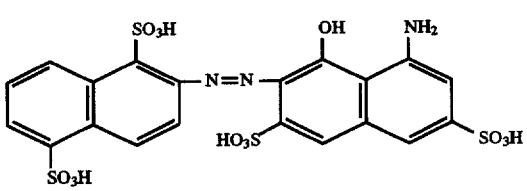 | bluish red |

-continued

| I | II |
|---|---|
| (naphthalene structure with SO₃H, OH, NH₂, HO₃S, SO₃H groups linked by N=N) | bluish red |
| (benzene-SO₃H, NH₂ linked via N=N to naphthalene with OH, NHCO-phenyl, HO₃S, SO₃H) | bluish red |
| CuPc—(SO₃H, SO₂NH₂, SO₂NH—C₆H₄—NH₂)₃ | turquoise |
| CuPc—(SO₃H, SO₂NH₂, SO₂NH—C₆H₃(SO₃H)(NH₂))₂,₈ | turquoise |
| (benzene-SO₃H linked via N=N to naphthalene with OH, NHCO—C₆H₄—NH₂, HO₃S, SO₃H) | red |
| O₂N—C₆H₃(SO₃H)—CH=CH—C₆H₃(SO₃H)—N=N—C₆H₄—NH₂ | yellow |
| H₂N—C₆H₃(SO₃H)—CH=CH—C₆H₃(SO₃H)—N=N—C₆H₄—NH₂ | yellow |
| H₂N(CH₂)₂NH—C₆H₃(SO₃H)—N=(quinone with Cl, O)=N—C₆H₃(SO₃H)—NH(CH₂)₂NH₂ | blue |

| I | II |
|---|---|
| (structure) | yellow |
| (structure) | yellow |
| (structure) | blue |
| (structure) | bluish red |
| (structure) | yellow |

EXAMPLE 4

27.3 parts of the dye of the formula

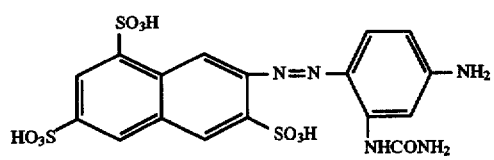

(113)

are dissolved in 600 parts by volume of water and condensed with 7 parts of 2,4,6-trifluoro-1,3,5-triazine. When no more diazotisable amino groups can be detected, 2 to 2.5 parts of ethylenediamine are added to the dye solution at 0 to 5° and a pH of 5–7. The pH of the reaction mixture is then increased to 7.5 by adding sodium carbonate and the temperature is slowly raised to 25°. After condensation is complete, acylation is carried out using 2 to 5 parts of acetic anhydride at a pH of 8–9. A mixture of the dyes of the formulae

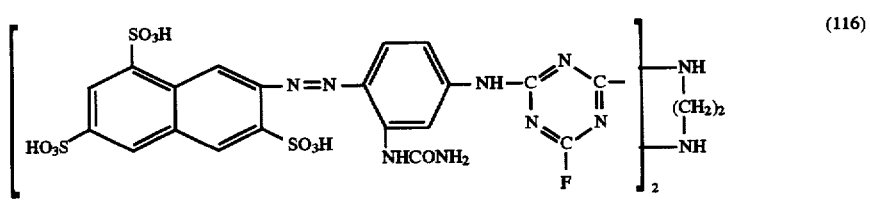

(116)

and

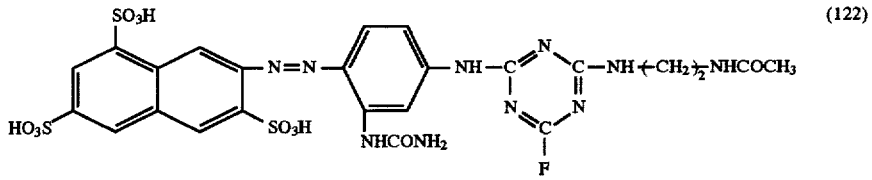

(122)

is then, after adding buffer salts, precipitated using sodium chloride, filtered, washed and dried. It is an orange powder and dyes cotton in golden yellow shades.

Other acylating agents, in particular aliphatic, aromatic or heterocyclic carbonyl chlorides can be used instead of acetic anhydride, for example acetyl chloride, propionyl chloride, propionic anhydride, 2-propanecarbonyl chloride, carboxypropionyl chloride, butyryl chloride, benzoyl chloride, 4-methylbenzoyl chloride, benzylcarbonyl chloride, 4-sulfobenzylcarbonyl chloride and pyridine-3-carbonyl chloride.

The diamines or chromophores listed following Example 2 can also be used instead of the ethylenediamine and the chromophore mentioned.

EXAMPLE 5

2 parts of the dye mixtures $A_1$, $A_2$ or $A_3$ obtained according to Examples $1a_1$, $1a_2$ or $1a_3$ are dissolved in 400 parts of water; 1500 parts of a solution containing 53 g of sodium chloride per liter are added to this solution. This dye bath is entered at 40° C. with 100 parts of a cotton fabric. After 45 minutes, 100 parts of a solution containing 16 g of sodium hydroxide and 20 g of anhydrous $Na_2CO_3$ per liter are added. The temperature of the dye bath is maintained at 40° C. for another 45 minutes. The material dyed golden yellow is then rinsed, soaped at the boil for a quarter of an hour using a nonionic detergent, rinsed again and dried. The material obtained is distinguished by very good fastness properties, in particular wet fastness properties. The material obtained has very high colour strength.

EXAMPLE 6

2 parts of the dye mixture D obtained according to Example 1d are dissolved in 400 parts of water; 1500 parts of a solution containing 53 g of sodium chloride per liter are added to this solution. This dye bath is entered at 35° C. with 100 parts of a cotton fabric. After 20 minutes, 100 parts of a solution containing 16 g of sodium hydroxide and 20 g of anhydrous $Na_2CO_3$ per liter are added. The temperature of the dye bath is maintained at 35° C. for another 15 minutes. The temperature is then increased to 60° C. over a period of 20 minutes. The temperature is maintained at 60° C. for another 35 minutes. The material dyed orange is then rinsed, soaped at the boil for a quarter of an hour using a nonionic detergent, rinsed again and dried. The material obtained is distinguished by very good fastness properties, in particular wet fastness properties. The material obtained has very high colour strength.

EXAMPLE 7

8 parts of the dye mixture F obtained according to Example 1f are dissolved in 400 parts of water; 1400 parts of a solution containing 100 g of sodium sulfate per liter are added to this solution. This dye bath is entered at 25° C. with 100 parts of a cotton fabric. After 10 minutes, 200 parts of a solution containing 150 g of trisodium phosphate per liter are added. The temperature is then increased to 60° C. over a period of 10 minutes. The temperature is maintained at 60° C. for another 90 minutes. The material dyed blue is then rinsed, soaped at the boil for a quarter of an hour using a nonionic detergent, rinsed again and dried. The material obtained is distinguished by very good fastness properties, in particular wet fastness properties. The material obtained has very high colour strength.

EXAMPLE 8

4 parts of the dye mixtures $A_1$, $A_2$ or $A_3$ obtained according to Examples $1a_1$, $1a_2$ or $1a_3$ are dissolved in 50 parts of water. 50 parts of a solution containing 5 g of sodium hydroxide and 20 g of anhydrous $Na_2CO_3$ per liter are added to the solution. The solution obtained is used to pad a cotton fabric such that its liquor pickup is 70%, and the fabric is then wound onto a roller. It is left in this manner at room temperature for 3 hours. The material dyed golden yellow is then rinsed, soaped at the boil for a quarter of an hour using a nonionic detergent, rinsed again and dried. The material obtained is distinguished by very good fastness properties, in particular wet fastness properties. The material obtained has very high colour strength.

EXAMPLE 9

6 parts of the dye mixture D obtained according to Example 1d are dissolved in 50 parts of water. 50 parts of a solution containing 16 g of sodium hydroxide per liter and 0.04 liter of water glass (38° Bé) are added to the solution. The solution obtained is used to pad a cotton fabric such that its liquor pickup is 70%, and the fabric is then wound onto a roller. It is left in this manner at room temperature for 10 hours. The material dyed orange is then rinsed, soaped at the boil for a quarter of an hour using a nonionic detergent, rinsed again and dried. The material obtained is distinguished by very good fastness properties, in particular wet fastness properties. The material obtained has very high colour strength.

EXAMPLE 10

2 parts of the dye mixture F obtained according to Example 1f are dissolved in 100 parts of water with the addition of 0.5 part of sodium m-nitrobenzenesulfonate. The solution obtained is used to impregnate a cotton fabric such that its liquor pickup is 75%, and the fabric is then dried. It is then impregnated with a warm solution of 20° C. containing 4 g of sodium hydroxide and 300 g of sodium chloride per liter, squeezed off to a liquor pickup of 75%, the blue dyeing is then steamed at 100° to 102° C. for 30 seconds, soaped in a 0.3% boiling solution of a nonionic detergent for a quarter of an hour, rinsed and dried. The material obtained is distinguished by very good fastness properties, in particular wet fastness properties. The material obtained has vet3, high colour strength.

EXAMPLE 11

3 parts of the dye mixtures $A_1$, $A_2$ or $A_3$ obtained according to Examples $1a_1$, $1a_2$ or $1a_3$ are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium bicarbonate with rapid stirring. The printing paste thus obtained is used to print a cotton fabric, and the printed fabric obtained is dried and steamed at 102° C. in saturated steam for 2 minutes. The fabric printed golden yellow is then rinsed, if necessary soaped at the boil, and rinsed again and then dried. The material obtained is distinguished by very good fastness properties, in particular wet fastness properties. The material obtained has very high colour strength.

EXAMPLE 12

5 parts of the dye mixture D obtained according to Example 1d are sprinkled into 100 parts of a stock thickener containing 50 parts of 5% sodium alginate thickener, 36.5 parts of water, 10 parts of urea, 1 part of sodium m-nitrobenzenesulfonate and 2.5 parts of sodium bicarbonate with rapid stirring. The printing paste thus obtained, whose stability meets the technical requirements, is used to print a cotton fabric, and the printed fabric obtained is dried and steamed at 102° C. in saturated steam for 8 minutes. The fabric printed orange is then rinsed, if necessary soaped at the boil, and rinsed again and then dried. The material obtained is distinguished by very good fastness properties, in particular wet fastness properties. The material obtained has very high colour strength.

What is claimed is:

1. A dye mixture, which contains dyes of the formulae

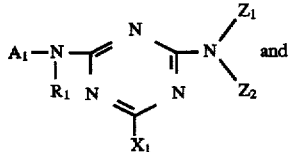  (1)

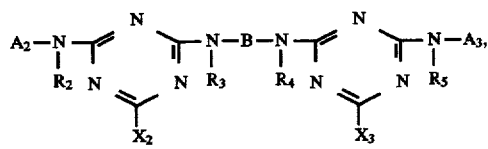  (2)

in which $A_1$, $A_2$ and $A_3$, independently of one another, are the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $R_1$, $R_2$, $R_3$, $R_4$ and $R_5$, independently of one another, are hydrogen or $C_1$-$C_4$alkyl, which can be substituted by halogen, hydroxyl, cyano, $C_1$-$C_4$alkoxy, $C_1$-$C_4$alkoxycarbonyl, carboxyl, sulfamoyl, sulfo or sulfato, B is an aromatic bridging member, and $Z_1$ and $Z_2$ are hydrogen or an aliphatic, aromatic or heterocyclic radical, or $Z_1$ and $Z_2$, together with the nitrogen atom linking them, form a five- to seven-membered ring, which apart from C atoms can contain further heteroatoms, and $X_1$, $X_2$ and $X_3$, independently of one another, are fluorine, chlorine, bromine, sulfo or carboxypyridinium.

2. A dye mixture according to claim 1, wherein the radicals $A_1$, $A_2$, $A_3$, $Z_1$ and $Z_2$, independently of one another, contain fibre-reactive radicals.

3. A dye mixture according to claim 1, wherein the weight ratio of the dyes of the formulae (1):(2) is 5:95 to 95:5.

4. A dye mixture according to claim 1, wherein B is substituted or unsubstituted phenylene or a radical of the formula

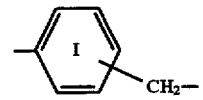

in which the benzene ring I can contain further substituents.

5. A dye mixture according to claim 1, wherein B is radical of the formula

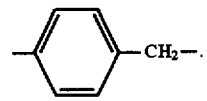

6. A dye mixture according to claim 1, wherein the radical $-N(Z_1)Z_2$ is $-NH_2$,

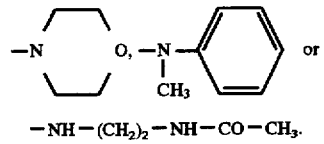

$-NH-(CH_2)_2-NH-CO-CH_3$.

7. A dye mixture according to claim 1, wherein $X_1$, $X_2$ and $X_3$, independently of one another, are fluorine or chlorine.

8. A dye mixture according to claim 1, wherein $X_1$, $X_2$ and $X_3$ are fluorine.

9. A dye mixture according to claim 1, wherein $R_1$, $R_2$, $R_3$, $R_4$ and $R_5$, independently of one another, are hydrogen, methyl or ethyl.

10. A dye mixture according to claim 1, wherein $R_3$ and $R_4$ are hydrogen.

11. A dye mixture according to claim 1, wherein $A_1$, $A_2$ and $A_3$, independently of one another, are monoazo or disazo dye radicals or formazan dye radicals.

12. A dye mixture according to claim 1, wherein the radicals $A_2$ and $A_3$ are identical.

13. A process for the dyeing and printing of cellulose-containing fibre materials using a dye mixture, which comprises applying thereto a dye mixture according to claim 1.

* * * * *